(12) United States Patent
Galati

(10) Patent No.: US 9,492,960 B2
(45) Date of Patent: Nov. 15, 2016

(54) NON-COAXIALLY MOUNTED ELECTRIC ACTUATOR AND TRANSMISSION

(71) Applicant: Synventive Molding Solutions, Inc., Peabody, MA (US)

(72) Inventor: Vito Galati, Rowley, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 386 days.

(21) Appl. No.: 14/325,443

(22) Filed: Jul. 8, 2014

(65) Prior Publication Data

US 2014/0319729 A1 Oct. 30, 2014

Related U.S. Application Data

(63) Continuation-in-part of application No. 13/484,336, filed on May 31, 2012, now Pat. No. 9,011,736, which is a continuation of application No. PCT/US2011/062099, filed on Nov. 23, 2011, (Continued)

(51) Int. Cl.
*B29C 45/23* (2006.01)
*B29C 45/28* (2006.01)

(52) U.S. Cl.
CPC ..... *B29C 45/281* (2013.01); *B29C 2045/2865* (2013.01); *B29C 2045/2872* (2013.01); *B29C 2945/76076* (2013.01); *B29C 2945/76277* (2013.01); *B29C 2945/76381* (2013.01); *B29C 2945/76598* (2013.01);

(Continued)

(58) Field of Classification Search
CPC ................ B29C 45/231; B29C 45/28; B29C 2945/76598
See application file for complete search history.

(56) References Cited

U.S. PATENT DOCUMENTS 6,294,122 B1 9/2001 Moss et al.
7,121,820 B2 10/2006 Tooman et al.
7,541,707 B2 6/2009 Hochhalter et al.

(Continued)

FOREIGN PATENT DOCUMENTS

EP 0831250 A2 3/1998
EP 2333377 A1 6/2011
WO 2010128984 A1 11/2010

OTHER PUBLICATIONS

Int'l. Search report and Written Opinion mailed Sep. 22, 2014 in Int'l. Appln. No. PCT/US2014/045648.

(Continued)

*Primary Examiner* — James Sanders
(74) *Attorney, Agent, or Firm* — Polsinelli PC

(57) ABSTRACT

An apparatus for controlling the rate of flow of fluid mold material comprising:
  a manifold, a valve pin having a pin axis, a pin connector and a stem, the valve pin being drivable into and out of open and closed positions relative to the gate,
  an electric actuator comprising an electric motor comprised of a motor housing that houses a drive shaft having a drive gear and a drive axis, a transmission comprised of a gear shaft, the drive gear and the transmission gear being drivably interconnected and arranged such that the drive axis and the gear axis are non-coaxially mounted or disposed relative to each other, wherein one or the other of the motor housing or the transmission housing are removably attached to a top clamping or mounting plate that is mounted upstream of the manifold and fixedly interconnected to a mold.

19 Claims, 23 Drawing Sheets

Related U.S. Application Data application No. 14/325,443, which is a continuation-in-part of application No. 13/484,408, filed on May 31, 2012, now Pat. No. 9,005,509, which is a continuation of application No. PCT/US2011/062096, filed on Nov. 23, 2011, application No. 14/325,443, which is a continuation-in-part of application No. 14/311,785, filed on Jun. 23, 2014.

(60) Provisional application No. 61/843,561, filed on Jul. 8, 2013.

(52) U.S. Cl.
CPC ............... *B29C 2945/76755* (2013.01); *B29C 2945/76859* (2013.01); *B29C 2945/76933* (2013.01)

(56) References Cited

U.S. PATENT DOCUMENTS

| | | |
|---|---|---|
| 7,588,436 B2 | 9/2009 | Tooman et al. |
| 8,091,202 B2 | 1/2012 | Galati et al. |
| 8,256,313 B2 | 9/2012 | Ganter |
| 2004/0082431 A1 | 4/2004 | Maydew |
| 2013/0104682 A1 | 5/2013 | Schneider |

OTHER PUBLICATIONS

HRS Flow Product Sheet, The new FLEXflow, HRS Flow Hotrunner Technology, S. Polo di Piave, Italy.

Mold Masters E-Drive User Manual, Mold-Masters Limited, Georgetwon, Ontario, Canada.

Int'l. Preliminary Report on Patentability dated Sep. 24, 2015 in corresponding Int'l. Appln. No. PCT/US2014/045648.

NON-COAXIALLY MOUNTED ELECTRIC ACTUATOR AND TRANSMISSION

RELATED APPLICATIONS

This application is a continuation-in-part of and claims the benefit of priority to U.S. application Ser. No. 13/484,336 filed May 31, 2012 which is a continuation of PCT/US2011/062099 filed Nov. 23, 2011, the disclosures of both of the foregoing are incorporated by reference in their entirety as if fully set forth herein.

This application is also a continuation-in-part of and claims the benefit of priority to U.S. application Ser. No. 13/484,408 filed May 31, 2012 which is a continuation of PCT/US2011/062096 filed Nov. 23, 2011, the disclosures of both of the foregoing are incorporated by reference in their entirety as if fully set forth herein.

This application is also a continuation-in-part of and claims the benefit of priority to U.S. application Ser. No. 14/311,785 filed Jun. 23, 2014.

This application also claims the benefit of priority to U.S. Provisional Application No. 61/843,561 filed Jul. 8, 2013 the disclosure of which is incorporated by reference in its entirety as if fully set forth herein.

The disclosures of all of the following are incorporated by reference in their entirety as if fully set forth herein: U.S. Pat. No. 5,894,025, U.S. Pat. No. 6,062,840, U.S. Pat. No. 6,294,122, U.S. Pat. No. 6,309,208, U.S. Pat. No. 6,287,107, U.S. Pat. No. 6,343,921, U.S. Pat. No. 6,343,922, U.S. Pat. No. 6,254,377, U.S. Pat. No. 6,261,075, U.S. Pat. No. 6,361,300, U.S. Pat. No. 6,419,870, U.S. Pat. No. 6,464,909, U.S. Pat. No. 6,599,116, U.S. Pat. No. 7,234,929, U.S. Pat. No. 7,419,625, U.S. Pat. No. 7,569,169, U.S. patent application Ser. No. 10/214,118, filed Aug. 8, 2002, U.S. Pat. No. 7,029,268, U.S. Pat. No. 7,270,537, U.S. Pat. No. 7,597,828, U.S. patent application Ser. No. 09/699,856 filed Oct. 30, 2000, U.S. patent application Ser. No. 10/269,927 filed Oct. 11, 2002, U.S. application Ser. No. 09/503,832 filed Feb. 15, 2000, U.S. application Ser. No. 09/656,846 filed Sep. 7, 2000, U.S. application Ser. No. 10/006,504 filed Dec. 3, 2001, and U.S. application Ser. No. 10/101,278 filed Mar. 19, 2002 and PCT/US2011/062099 filed Nov. 23, 2011 and PCT/US2011/062096 filed Nov. 23, 2011.

BACKGROUND OF THE INVENTION

Injection molding systems powered electric actuators have been developed having a drive rotor with an axis aligned with the axis of a valve pin to cause the pin to move either upstream or downstream over the course of the injection portion of an injection cycle in order to raise or lower the rate of flow of fluid material to correspond to a predetermined profile of fluid flow rates for the injection cycle.

SUMMARY OF THE INVENTION

In accordance with the invention there is provided, an apparatus for controlling the rate of flow of fluid mold material from an injection molding machine to a mold cavity, the apparatus comprising:

a manifold that receives an injection fluid mold material, the manifold having a delivery channel that delivers the injection fluid mold material under an injection pressure to a gate of a mold cavity disposed within a mold, the gate being controllably opened and closed by a valve pin having a pin axis, the valve pin being slidably mounted for reciprocal upstream and downstream linear movement along the pin axis such that a downstream end of the valve pin is drivable into and out of open and closed positions relative to the gate, an electric actuator comprising an electric motor comprised of a motor housing that houses a drive shaft having a drive gear and a drive axis that is rotatably mounted within the motor housing and is drivably rotatable around the drive axis by a source of electrical power or energy and a transmission comprised of a gear shaft rotatably mounted within a transmission housing, the gear shaft having a gear axis and a transmission gear drivably rotatable around the gear axis, the drive gear and the transmission gear being drivably interconnected and arranged such that the drive axis and the gear axis are non-coaxially mounted or disposed relative to each other and such that driven rotation of the drive gear around the drive axis rotatably drives the gear shaft around the gear axis, a linear travel converter comprising a travel shaft having a travel axis, the gear shaft being interconnected to an upstream end of the liner travel converter and the valve pin being interconnected to a downstream end of the linear travel converter, the interconnection between the converter and the gear shaft being adapted to convert rotation of the gear shaft to linear travel of the travel shaft along the travel axis, the linear travel converter being mounted for controllable upstream and downstream linear travel together with the valve pin via the interconnection of the downstream end of the linear travel converter to the valve pin, wherein one or the other of the motor housing or the transmission housing are removably attached to a top clamping or mounting plate that is mounted upstream of the manifold and fixedly interconnected to the mold.

The valve pin typically comprises a pin stem and a pin connector, the linear travel converter having a coupling that is reversibly couplable to and decouplable from the pin connector in a radial direction relative to the travel axis, the pin stem extending from the linear travel converter into the manifold when the actuator is coupled to the top clamping or mounting plate and the pin connector is received within the actuator coupling, the actuator being mounted on, to or within the top clamping or mounting plate for radial movement upon decoupling of the actuator from the top clamping or mounting plate such that the pin connector is decouplable from the actuator coupling upon said radial movement while the actuator is disposed on or within the mounting plate, the actuator being removable from on or within the mounting plate leaving the valve stem behind extending into the manifold.

The pin connector typically comprises an adapter coupled to a top or upstream end of the stem, the adapter configured to be reversibly receivable within the coupling in a radial direction.

The adapter can comprise an enlarged head which is reversibly couplable to and decouplable from the coupling.

The apparatus is preferably adapted to allow the pin connector to travel a selected radial distance within the coupling and to remain coupled while the top clamping or mounting plate remains coupled to the mold and the pin stem remains extended into the manifold.

The pin stem is typically mounted to the manifold for radial movement of the pin stem together with the manifold relative to the top clamping or mounting plate.

The apparatus is preferably adapted to allow the adapter to travel a selected radial distance within the coupling relative to the axial path of travel while the mounting plate remains coupled to the mold, the pin connector remains coupled to the actuator coupling and the pin stem remains extended into the manifold.

The top clamping or mounting plate is typically decouplable from the mold leaving the pin stem extended into the manifold when the adapter is decoupled from the coupling.

The motor housing is preferably removably attached to the top clamping or mounting plate and the transmission housing is removably attached to the motor housing.

The transmission housing can be removably attached to the top clamping or mounting plate and the motor housing can be removably attached to the transmission housing.

The actuator is typically interconnected to a controller that includes instructions that instruct the actuator to drive the valve pin upstream continuously from the second position to the third maximum upstream position at one or more high rates of travel that are equal to or greater than the one or more intermediate rates of travel.

The apparatus can further comprise a position sensor that senses a position of either the actuator or the valve pin, the position sensor sensing the position of the actuator or the valve pin and sending a signal indicative of the position of the actuator or the valve pin to the controller;

the controller instructing the actuator to drive the valve pin continuously upstream from a first gate closed position to a second upstream position at a velocity that is less than a maximum velocity at which the actuator is capable of driving the valve pin.

The drive gear and the transmission gear can be rotatably interconnected via gears or via belt and pulley In another aspect of the invention there is provided a method of driving a valve pin in apparatus for controlling the rate of flow of fluid mold material from an injection molding machine to a mold cavity, the apparatus comprising a manifold that receives an injection fluid mold material, the manifold having a delivery channel that delivers the injection fluid mold material under an injection pressure to a gate of a mold cavity disposed within a mold, the gate being controllably opened and closed by a valve pin having a pin axis, a pin connector and a stem, the valve pin being slidably mounted for reciprocal upstream and downstream linear movement along the pin axis such that a downstream end of the valve pin is drivable into and out of open and closed positions relative to the gate, an electric actuator comprising an electric motor comprised of a motor housing that houses a drive shaft having a drive gear and a drive axis that is rotatably mounted within the motor housing and is drivably rotatable around the drive axis by a source of electrical power or energy and a transmission comprised of a gear shaft rotatably mounted within a transmission housing, the gear shaft having a gear axis and a transmission gear drivably rotatable around the gear axis, the method comprising:

meshing and arranging the drive gear and the transmission gear such that the drive axis and the gear axis are disposed at a non-coaxial angle relative to each other and such that driven rotation of the drive gear rotatably drives the gear shaft around the gear axis, interconnecting a linear travel converter comprising a travel shaft having a travel axis to an upstream end of the liner travel converter and interconnecting the valve pin to a downstream end of the linear travel converter, adapting the interconnection between the converter and the gear shaft to convert rotation of the gear shaft to linear travel of the travel shaft along the travel axis, mounting the linear travel converter for controllable upstream and downstream linear travel together with the valve pin via the interconnection of the downstream end of the linear travel converter to the valve pin, removably attaching one or the other of the motor housing or the transmission housing to a top clamping or mounting plate that is mounted upstream of the manifold and fixedly interconnected to the mold.

The drive gear and the transmission gear are preferably rotatably interconnected via gears or via belt and pulley.

Preferably, the actuator is interconnected to a controller that includes instructions that instruct the actuator to drive the valve pin upstream continuously beginning from the closed position to one or more intermediate upstream positions at one or more intermediate rates of travel that are less than a maximum velocity at which the actuator is capable of driving the valve pin for either a predetermined amount of time or for a predetermined length of upstream travel.

Most preferably the controller includes instructions that instruct the actuator to drive the valve pin continuously upstream from the one or more intermediate upstream positions to a maximum upstream position at one or more high rates of travel that are equal to or greater than the one or more intermediate rates of travel.

The apparatus can further comprise a position sensor that senses a position of either the actuator or the valve pin, the position sensor sensing the position of the actuator or the valve pin and sending a signal indicative of the position of the actuator or the valve pin to the controller; the controller instructing the actuator to drive the valve pin continuously upstream from the one or more intermediate upstream positions at the one or more high rates of travel on detection by the position sensor of the valve pin at the one or more intermediate upstream positions.

The controller can include instructions that instruct the actuator to drive the valve pin at one or more high rates of downstream travel that are equal to or less than a maximum rate of downstream travel at which the actuator is capable of driving the valve pin when the valve pin is disposed at a maximum upstream position during the course of an injection cycle.

In such an embodiment, the controller typically includes instructions that instruct the actuator to drive the valve pin at one or more intermediate rates of downstream travel that are less than the one or more high rates of downstream travel on expiration of a predetermined amount of time or for a predetermined amount of downstream travel of the valve pin from the maximum upstream position.

In another aspect of the invention there is provided a method of driving a valve pin in apparatus for controlling the rate of flow of fluid mold material from an injection molding machine to a mold cavity, the apparatus comprising:

a manifold that receives an injection fluid mold material, the manifold having a delivery channel that delivers the injection fluid mold material under an injection pressure to a gate of a mold cavity disposed within a mold, the gate being controllably opened and closed by a valve pin having a pin axis, a pin stem and a pin connector, the valve pin being slidably mounted for reciprocal upstream and downstream linear movement along the pin axis such that a downstream end of the valve pin is drivable into and out of open and closed positions relative to the gate, an electric actuator comprising an electric motor comprised of a motor housing that houses a drive shaft having a drive gear and a drive axis that is rotatably mounted within the motor housing and is drivably rotatable around the drive axis by a source of electrical power or energy and a transmission comprised of a gear shaft rotatably mounted within a transmission housing, the gear shaft having a gear axis and a transmission gear drivably rotatable around the gear axis, the drive gear and the transmission gear being drivably interconnected and arranged such that the drive axis and the gear axis are non-coaxially mounted or disposed relative to each other and such that driven rotation of the drive gear around the drive axis rotatably drives the gear shaft around the gear axis, a linear travel converter comprising a travel shaft having a travel axis, the gear shaft being interconnected to an upstream end of the linear travel converter and the valve pin being interconnected to a downstream end of the linear travel converter, the linear travel converter having a pin coupling that is reversibly couplable to and decouplable from the pin connector in a radial direction relative to the travel axis, the interconnection between the converter and the gear shaft being adapted to convert rotation of the gear shaft to linear travel of the travel shaft along the travel axis, the linear travel converter being mounted for controllable upstream and downstream linear travel together with the valve pin via the interconnection of the downstream end of the linear travel converter to the valve pin, wherein one or the other of the motor housing or the transmission housing are removably attached to a top clamping or mounting plate that is mounted upstream of the manifold and fixedly interconnected to the mold, the method comprising:

decoupling the actuator from the top clamping or mounting plate, radially moving the actuator while the actuator is disposed on or within the top clamping or mounting plate a distance sufficient to decouple the pin connector from the pin coupling.

Such a method can further comprise removing the actuator from on or within the top clamping or mounting plate leaving the valve stem behind extending into the manifold.

BRIEF DESCRIPTION OF THE DRAWINGS

The above and further advantages of the invention may be better understood by referring to the following description in conjunction with the accompanying drawings in which:

FIGS. 10H-10M illustrate a series of method steps by which an actuator can be decoupled from a valve pin wherein FIG. 10H is a side schematic sectional view (similar to FIG. 10E) showing the actuator and valve pin assembly coupled and mounted in an injection molding apparatus.

FIG. 10I shows the housing of the actuator decoupled from the mounting or clamp plate.

FIG. 10J is a view similar to FIG. 10H after the actuator has been decoupled from the mounting plate and moved radially to the left to decouple the pin connector or adapter from the coupling at the downstream end of the actuator;

FIG. 10J is a view similar to FIG. 10I but showing the actuator to being removed from the mounting plate while the valve pin assembly remains behind extended into the manifold.

FIG. 10K is a view similar to FIG. 10J showing the actuator having been moved upstream to a position approaching being removed from within the recess provided in the top clamping or mounting plates in which the actuator is disposed when coupled to the plates.

FIG. 10L is view showing the actuator having been completely removed from its former position disposed within or on the mounting plate leaving the pin stem behind mounted to the manifold.

FIG. 10M is a view showing the top mounting or clamp plates having been removed or decoupled from the mold together with the actuator having been decoupled from the pin connector leaving the pin stem behind mounted to the manifold.

DETAILED DESCRIPTION

Figure 1:
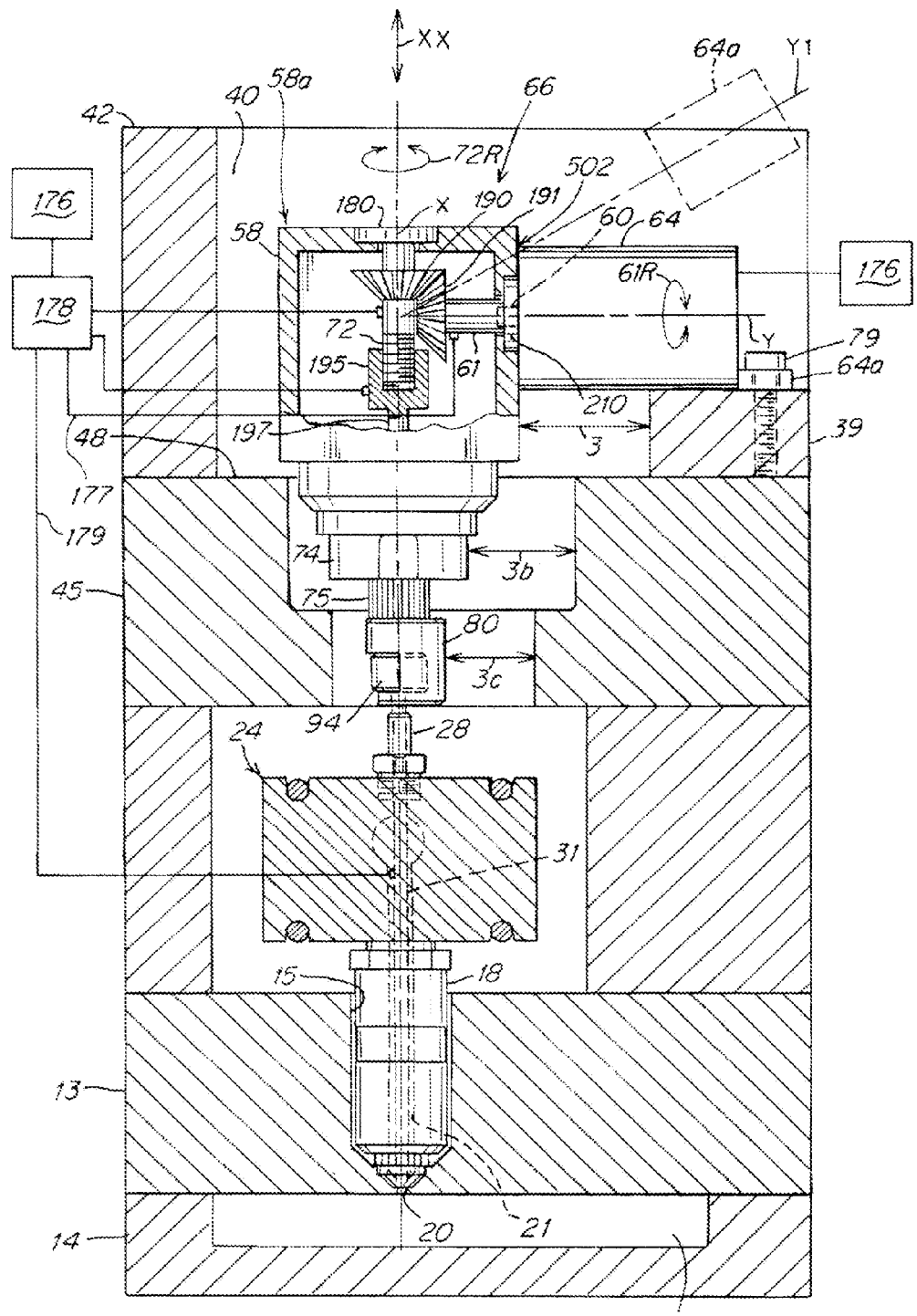
FIG. 1 is a schematic cross-section of an embodiment of the invention showing an actuator comprised of an electric motor and gear box where the housing of the motor is fixedly and removably attached to the upstream top clamping plate of the system.
Figure 2:
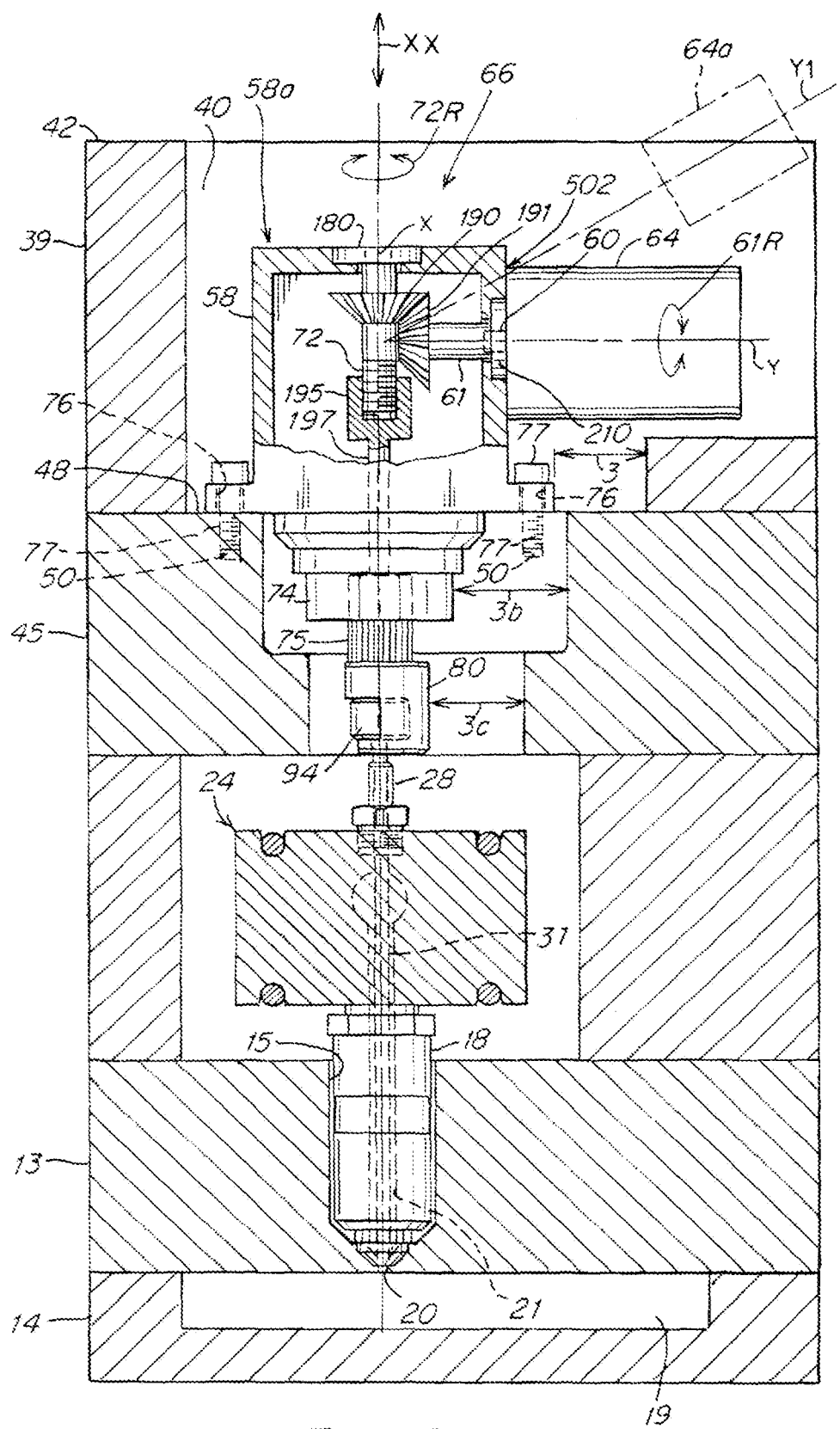
FIG. 2 is a schematic cross-section of another embodiment of the invention where the housing of the gear box is fixedly and removably attached to the upstream top clamping or mounting plate of the system.

FIGS. 1, 2 shows one embodiment of the invention comprised of an electric actuator 66 assembly that is comprised of an electric motor 64 drivably interconnected to a gear 72/190 in a non-coaxially aligned X-Y arrangement. The shaft 60 of the electrically driven motor 64 has an axis Y, the shaft 60 being rotatably driven by electrical power, the shaft 60 being interconnected to a valve pin 31 through a bevel gear engagement between the head 190 of a screw 72 and the head 191 of an extension member 61 of the motor shaft 60. As can be readily imagined, the screw component 72 can alternatively have threads along its length (in place of the beveled head 190) which mesh with a worm at the end of extension 61 (in place of the beveled member 191). As shown, the axis Y of the shaft 60 is non-coaxially perpendicular to the axis X of the pin 31 and the actuating screw mechanism 72 such that axial forces which may occur along axis X are not transmitted along axis Y to the shaft 60.

In the FIGS. 1, 2 embodiment, the screw 197 has a nut 195 integrally forming the end of the screw 197 which is drivably interconnected to, i.e. screwably engaged with, the actuating screw 72. The pin 50 is slidably mounted in a complementary aperture within manifold 24 for movement along its axis X within melt flow channel 20. The actuating screw 72 is mounted via disc 180 to housing 58 which is, in turn, fixedly mounted to mounting plate 45 such that screw 72 is drivably rotatable around axis X and axially stationary along axis X. Screw 72 is drivably rotatable around axis X via the screwable engagement between bevel gears 190,191. Shaft extension member 61 is coaxially connected to the motor shaft 60 (via rigid connection between connecting disc 210 and a complementary connecting member attached to shaft 60 which is not shown) such that as the shaft 60 is rotatably driven around axis Y the extension member 61 and its associated bevel gear 191 are simultaneously rotatably driven around axis Y. As can be readily imagined, as screw 72 is rotatably driven around axis X via the meshed bevel gears 190, 191, pin 31 is translationally driven along axis X via the screwable engagement between nut end 195 and screw 72. Thus the screw 72 acts as an actuating member to and through which axial forces are transmitted to and from pin 31.

Figure 3:
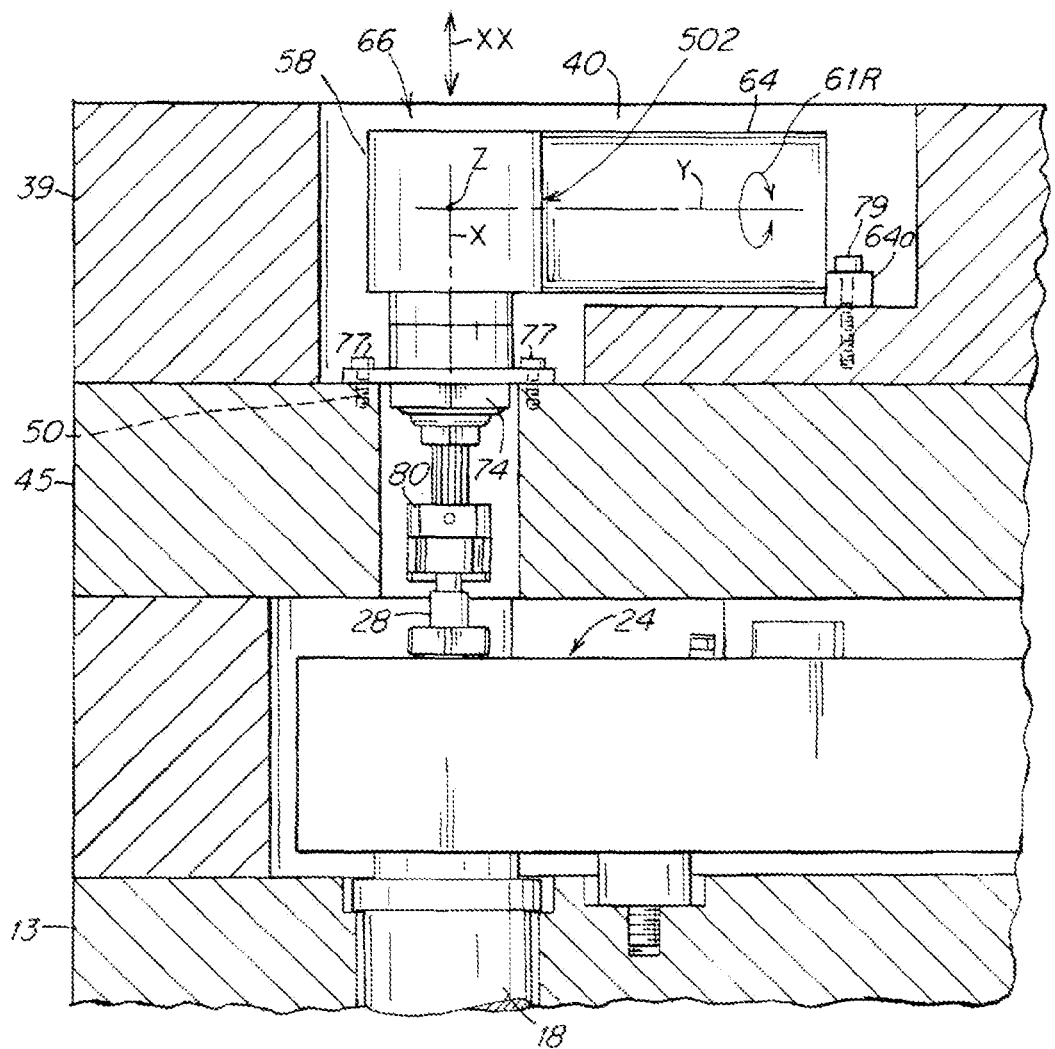
FIG. 3 is a cross-sectional view of an assembled injection molding system comprised of an electric actuator having a non-coaxial gear transmission according to the invention.
Figure 3A:
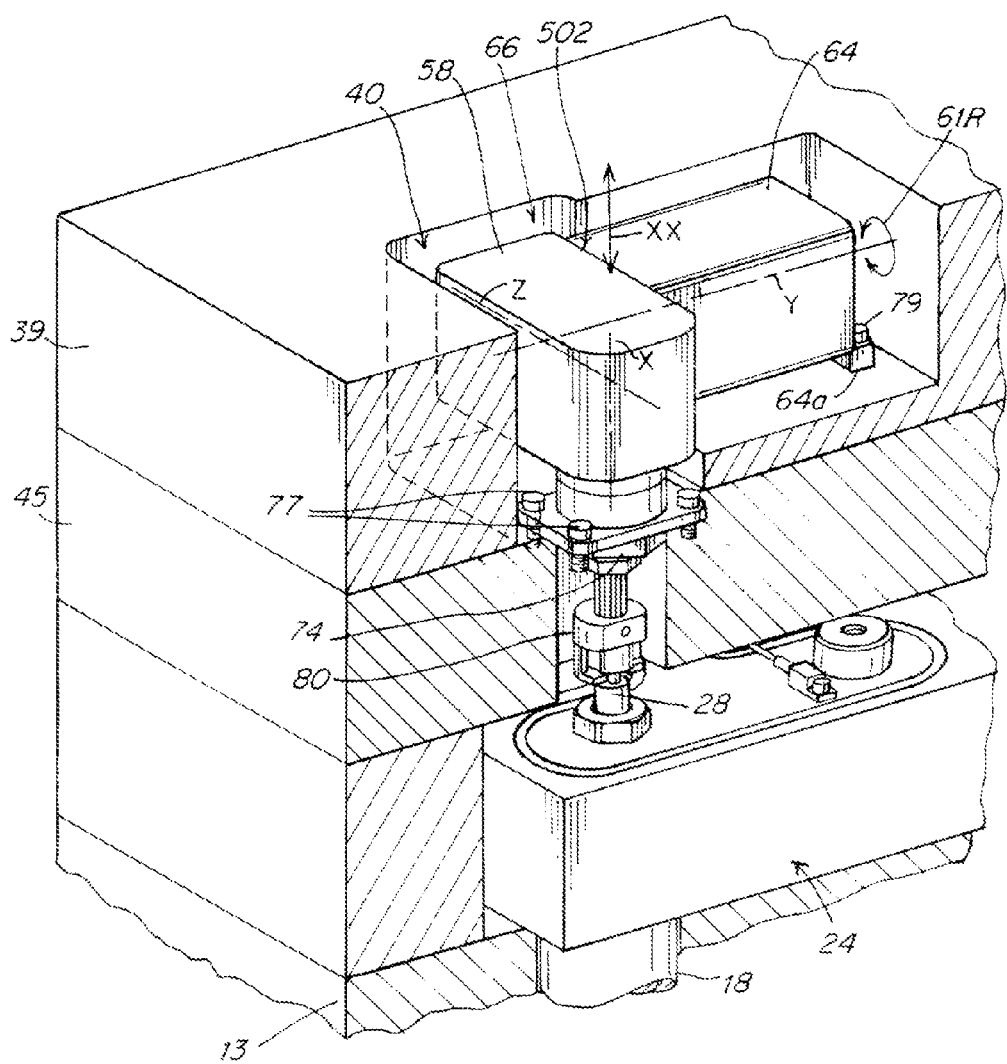
FIG. 3A is a perspective view of the FIG. 3 system.
Figure 3B:
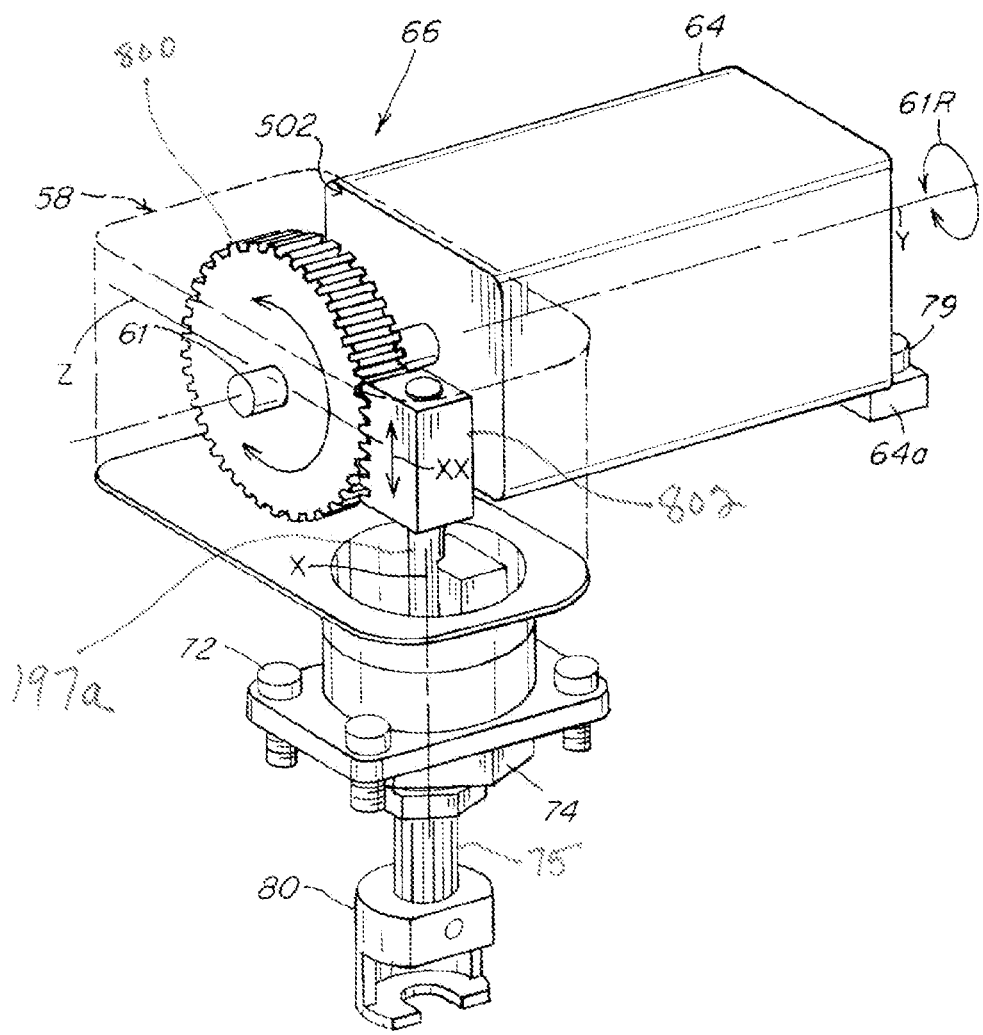
FIG. 3B is a perspective, partially cut-away view of the motor, motor housing and components that mount the housing and the valve pin of the FIG. 3 system.
Figure 4:
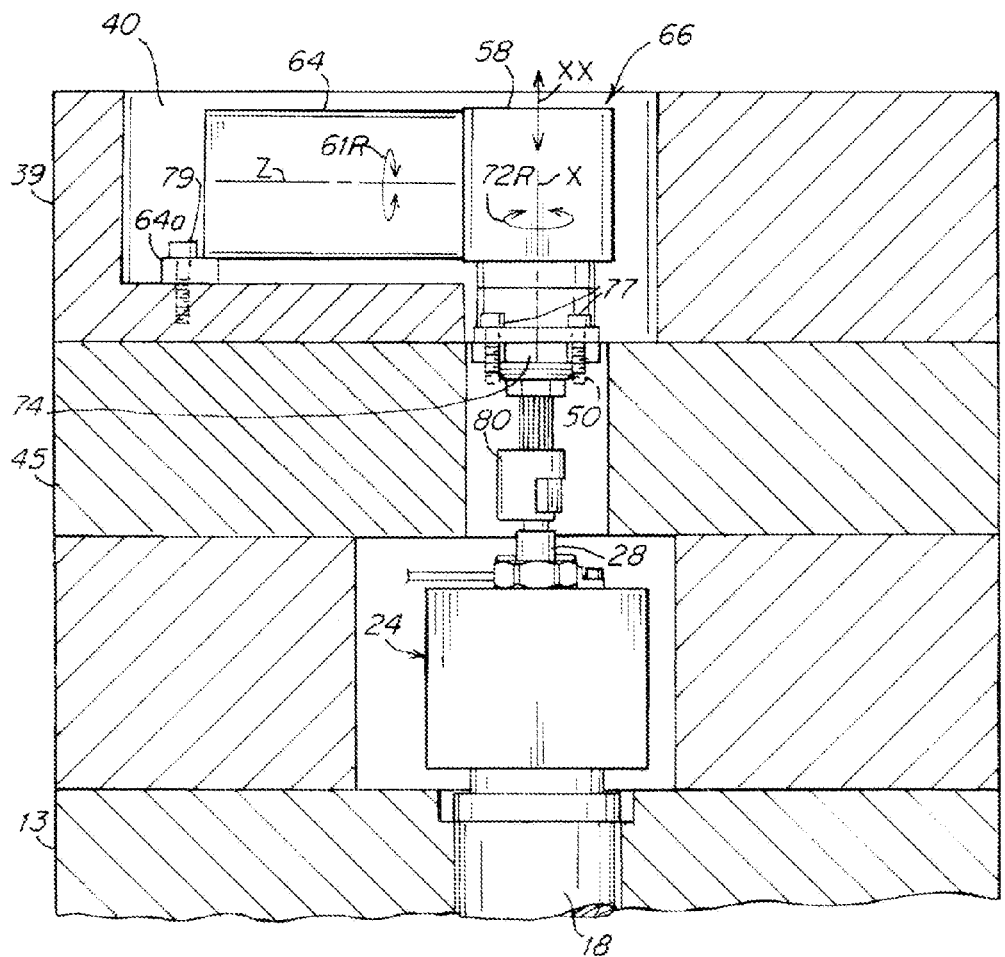
FIG. 4 is a cross-sectional view of an assembled injection molding system comprised of another embodiment of an electric actuator having a non-coaxial gear transmission according to the invention.

FIGS. 1, 3A, 3B, 4, 5 show an embodiment where the electric motor 64 component of the actuator 66 is coupled to the top clamp plate 39 via bolts 79 interconnecting motor housing portion 64a and plate 39. Complementary tapped holes are provided in the upper surface of the upper mounting plate 39 for receiving the bolts 79 and securing the motor housing 64 to the plate 39. This prevents rotational and other movement of the housing 64 and gear box housing 58 with respect to the mounting plates 39, 45 and manifold 24 and the injection molding apparatus generally. Extending downwardly from the screw 195 is a cylindrical projection 74 from which the downstream neck 75 of the coupler screw extends. Coupled to the downstream end of the neck 75 is the actuator coupling 80 and extending axially downstream from the coupling 80 is the valve pin 31. FIGS. 3, 4 show an alternative mounting of the motor housing 64 to the top clamp plate 39 via an extension 64a and bolt 79, as alternative to the mounting of the transmission gear housing 58 to the top clamping or mounting plate 45 via bolts 77.

FIGS. 2, 6, 7, 8, 9 show an alternative embodiment where the gear box 58 includes four bores 76, one in each corner of the housing, for receiving bolts 77 that removably couple the gear box housing 58 to the lower mounting plate 45. Four complementary tapped holes 50 are provided in the upper surface 48 of the lower mounting plate 45 for receiving the bolts 77 and securing the gear box housing 58 to the plate 45. This prevents rotational and other movement of the housing 58 and its attached motor 64 with respect to the mounting plates 39, 45 and manifold 24 and the injection molding apparatus generally. Extending downwardly from the screw 195 is a cylindrical projection 74 from which the neck 75 of the coupler screw extends. Coupled to the downstream end of the neck 75 is the actuator coupling 80 and extending axially downstream from the coupling 80 is the valve pin stem 31. FIGS. 2-10 all show one alternative arrangement where the gear housing 58 is bolted 77 to the top clamp or mounting plate 45 as an alternative to mounting of the motor housing 64 to the top clamp or mounting plate 39.

As can be readily imagined the housings 58 and 64 are fixedly connected to each other by conventional attachment mechanism 502 such that when one of the housings 58 or 64 is fixedly bolted 77 or 79 to a clamp or mounting plate 39, 45, the other of the two housings 58 or 64 is fixedly mounted to the same plate via fixed connection between 502 the two housings 58, 64.

FIGS. 1, 2 show the actuator 66 comprised of a transmission assembly 58a that is comprised of a gear box 58 assembled together with the other components of the system to form a stack that includes a nozzle 18 mounted in a receiving well 15 formed within a mold plate 13 in an injection molding stack arrangement. As shown a heated manifold 24 is disposed between the pair of upstream top clamping or mounting plates 39/45 and the downstream mold plates 13/14. The valve pin 31 is mounted to the manifold within a bushing 28 having a complementary internal bore for slidably receiving the pin 31 such that the pin can reciprocally travel XX along axis X. The valve pin 31 has a downstream distal tip end that opens and closes a gate aperture 20 that leads to the mold cavity 19. In use, the mounting plates 39, 45 and mold plates 13, 14 are fixedly secured together under high clamp pressure, so as to withstand high injection molding forces. A nozzle 18 extends through a bore 15 in the lower mold plate 14, and seats and unseats in the gate 20 to the injection mold cavity 19. The actuator 66 is disposed in a chamber 40 of the upper mounting plate 39, with a radial clearance 3 provided in at least one radial direction so as to facilitate the radial coupling and decoupling of the pin head adapter 94 and actuator coupling 80. Similarly, there is a radial clearance 3b/3c to allow the projecting neck 75 and adapter 80 to move radially in the plates.

As described in U.S. Pat. No. 6,294,122 (the disclosure of which is incorporated herein by reference in its entirety as if fully set forth herein) the electric motor is powered and driven by electrical energy or power input to coils that typically rotatably drive a magnet that in turn rotatably drives motor shaft 61.

In the FIGS. 1, 2 embodiment, the distal end of the rotor 61 of the motor 64 has a beveled gear head 191 that meshes with and rotatably drives a beveled gear head 190 formed on the shaft of a linear travelling XX screw 72 (linear travel converter) that comprise the transmission assembly 58a. As shown, the gear head 190 is integrally formed together with a shaft having a downstream end that has male threads forming a screw 72 that is screwably engaged within the female screws bored within the upstream head 195 of a linear conversion screw 197. The downstream distal end of the screw 197 is connected to actuator coupling 80 which removably receives the upstream head portion 94 of valve pin 31 as described in detail in U.S. Pat. No. 8,091,202. The driven rotation motion 61R of motor shaft 61 is thus converted from rotatable motion to controllably driven linear motion XX along axis X of the valve pin 31 via the driven rotation of the gear screw 72 and driven linear movement of the linear conversion screw 197 via the screwable engagement of screw and head 195.

As shown in FIGS. 1, 2 the arrangement or disposition of the motor axis Y is non-coaxial to the axis X of the transmission gear and screws 72, 195, 197 and valve pin 31. As shown the arrangement of the axes X and Y can be about 90 degrees relative to each other. Alternatively, the axis Y1 of the drive shaft can be disposed at any non-coaxial angle between zero and 180 degrees relative to the axis X of the transmission and valve pin, the design of the meshed gears 190, 191 being adapted to enable such an arrangement.

FIGS. 3A, 3B shows another gearing arrangement where a circular gear 800 attached to distal end of motor drive shaft 61 is controllably rotatably drivable 61R around axis Y to drive XX the gear rack 802 (linear travel converter) along axis X via meshing of the gears of gear 800 with the gears of rack 802, the rack 802 being fixedly attached to the upstream end of a linear traveler rod 197a that is interconnected at its downstream end to coupler 80. Thus the valve pin when coupled to coupler 80 is controllably drivable along the X axis by controlled driving of the shaft 61 of the motor around the perpendicular axis Y.

Figure 5:
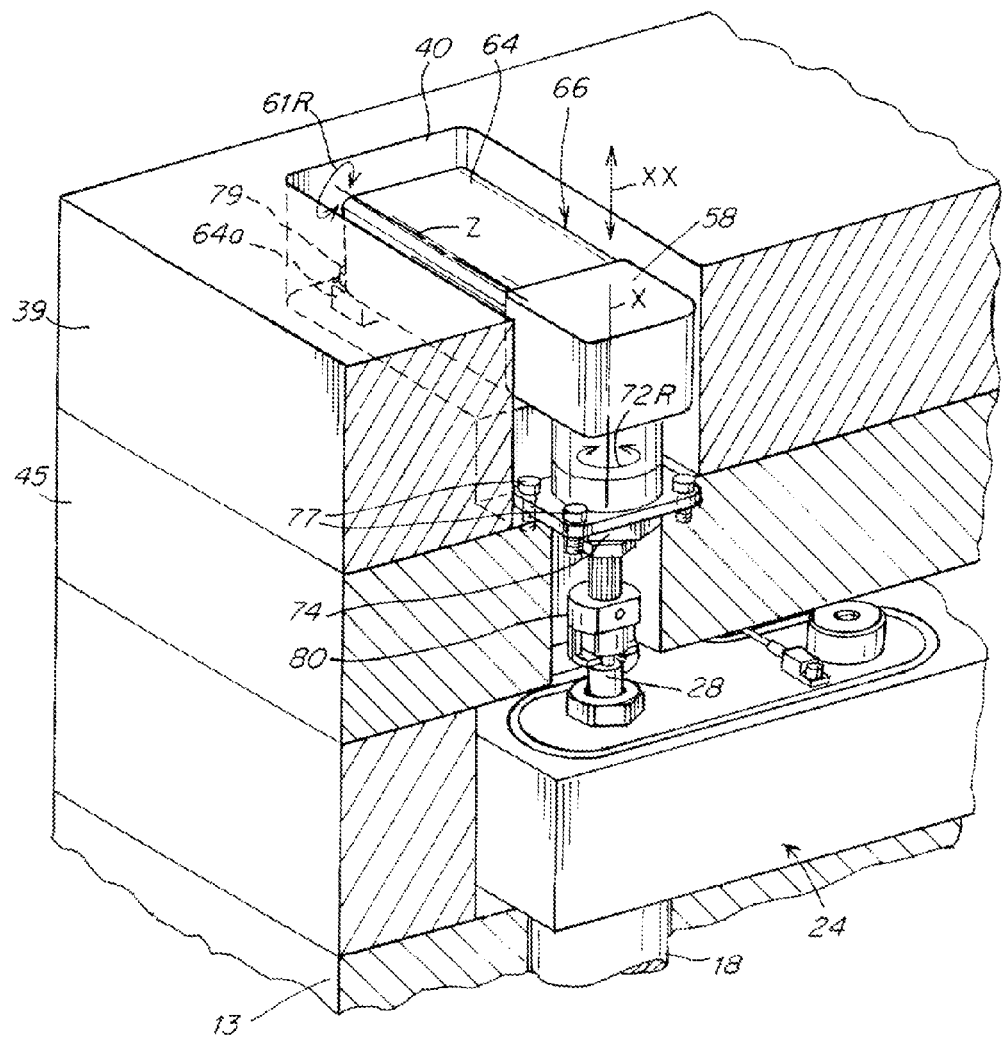
FIG. 5 is a perspective view of the FIG. 4 system.
Figure 6:
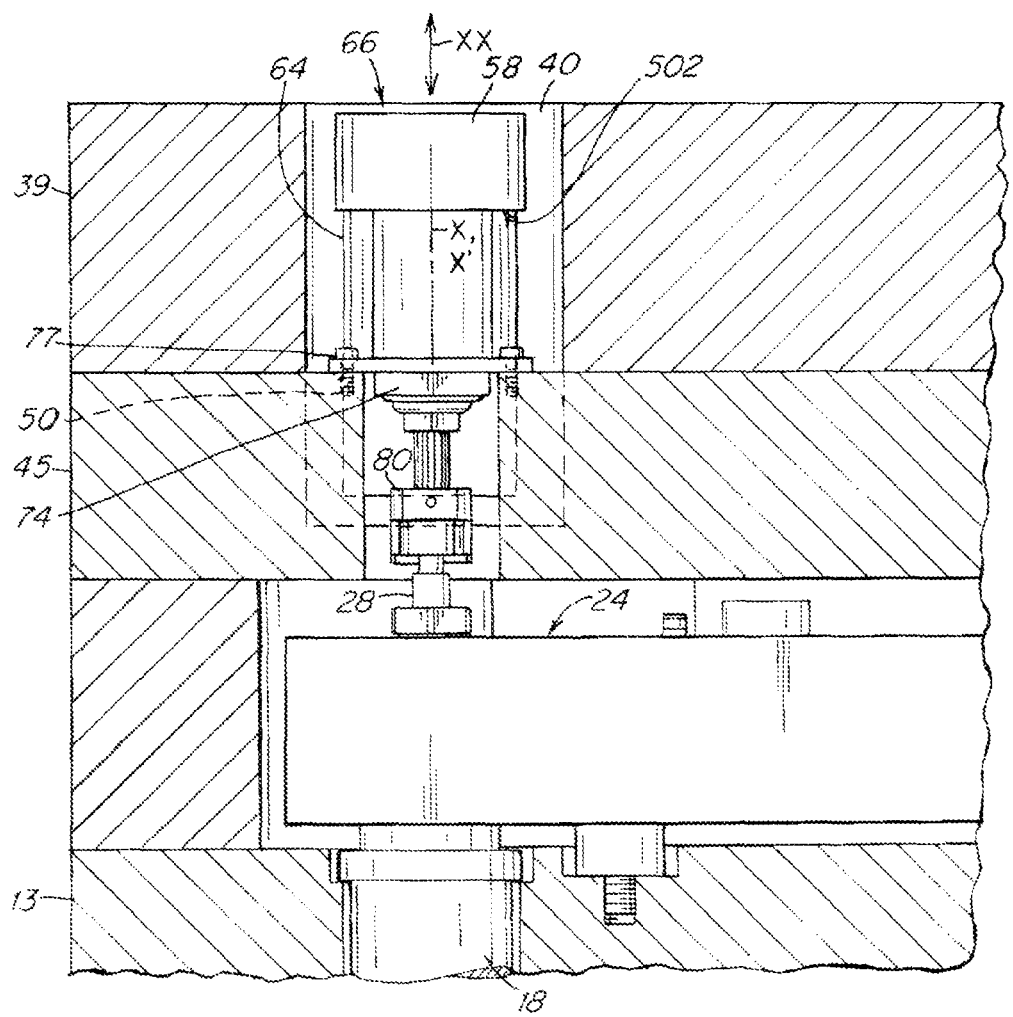
FIG. 6 is a front cross-sectional view of an assembled injection molding system comprised of another embodiment of an electric actuator having a non-coaxial gear transmission according to the invention.
Figure 7:
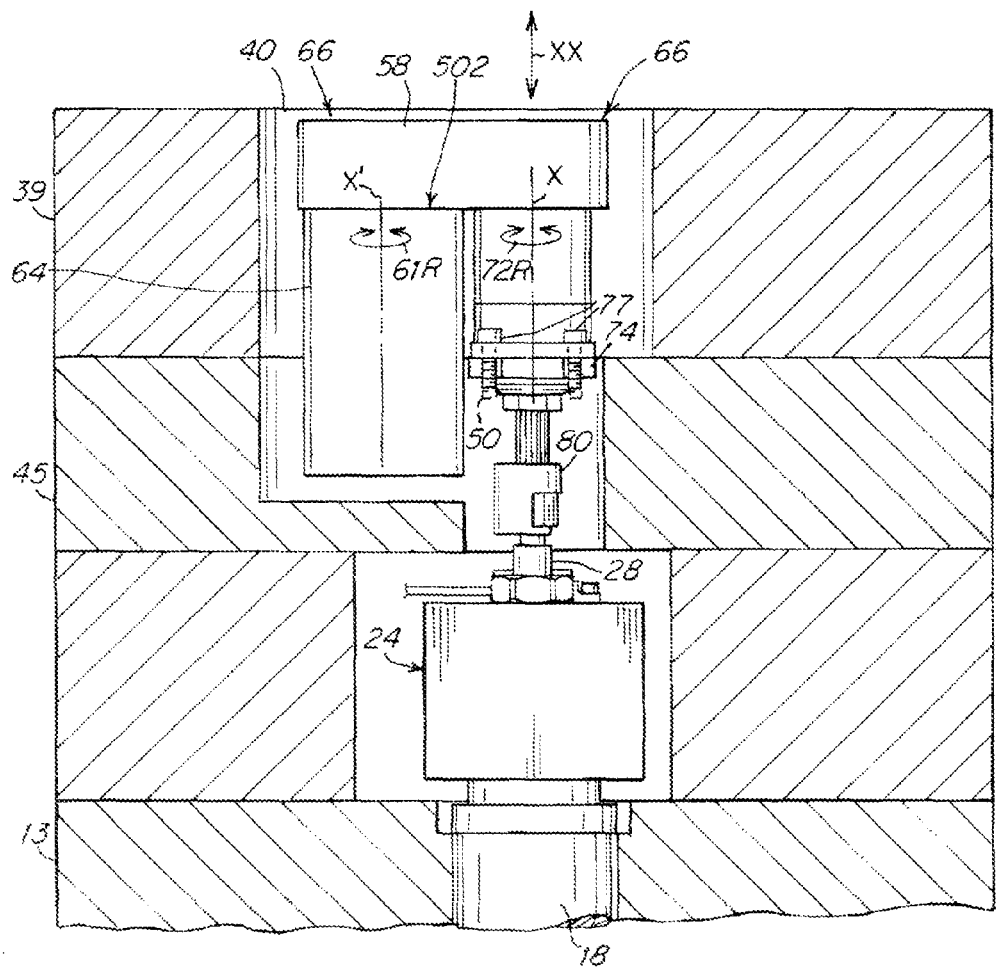
FIG. 7 is a side view of the FIG. 6 system.
Figure 8:
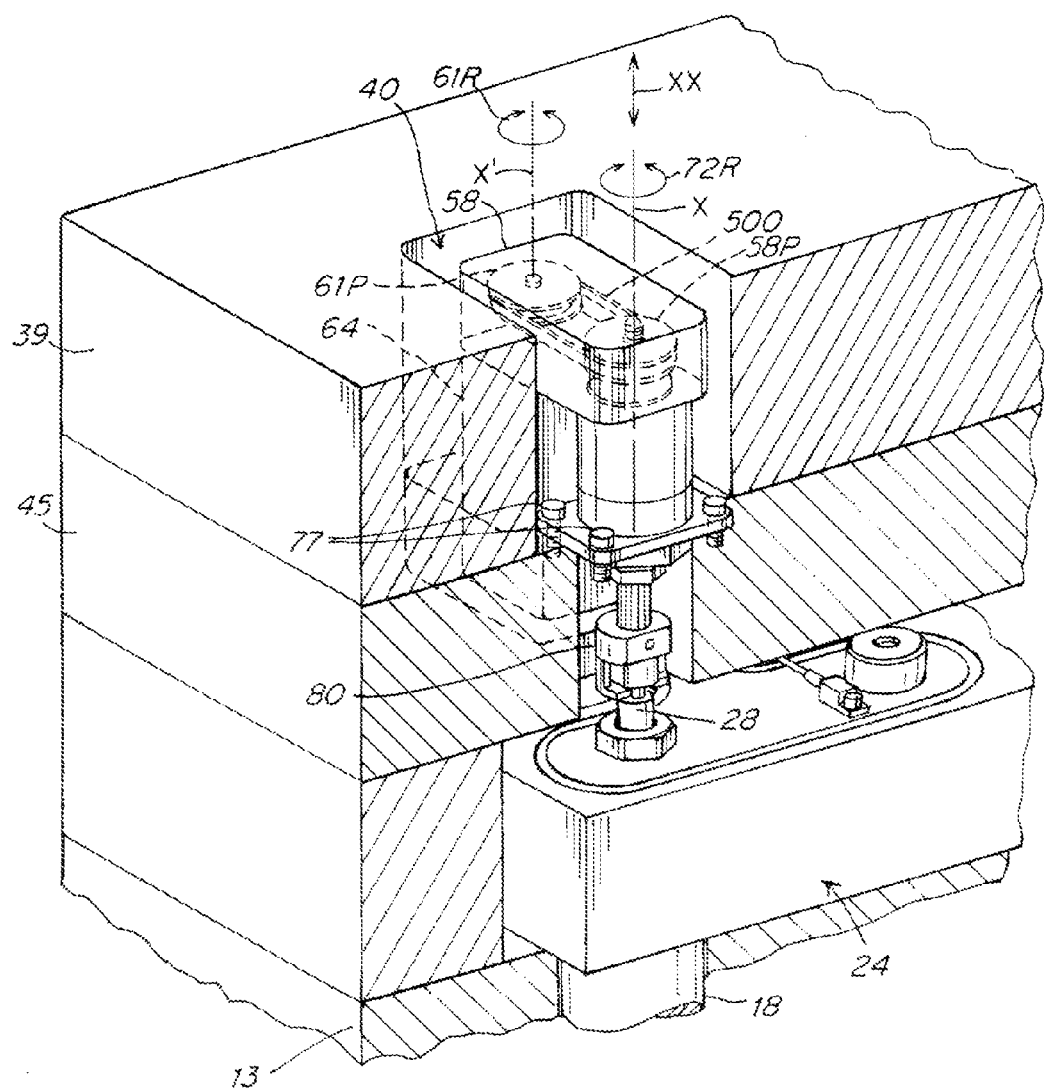
FIG. 8 is a perspective view of an assembled injection molding system comprised of another embodiment of an electric actuator having a non-coaxial gear transmission with the motor shaft and transmission assembly shaft connected via pulleys and a belt according to the invention.

In another alternative embodiment shown in FIGS. 4, 5, 6 the motor 64 housing (or the gear box housing 58) could be mounted to the top clamping plate or mounting plate in an arrangement such that the drive shaft 61 of the motor 64 is aligned along the Z axis and a gear attached to the distal end of the shaft is meshed with a complementary gear at the upstream end of a complementary linear travel converter screw or rod similar to those described above regarding the FIGS. 1-3B embodiments to drive the valve pin along the non-coaxial axis X.

In the FIGS. 5-9 embodiments, driven rotation movement 61R of a motor shaft 61 is similarly converted to linear movement XX via interconnection of the motor shaft 61 to a pulley 61P and interconnection of the transmission shaft to a transmission pulley 58P with the two pulleys 58P, 61P being rotatably interconnected by belt 500. In such an embodiment, the axis Y of the motor rotor 61 is non-coaxial to the axis X of the transmission, the axes X and Y shown as being disposed at 180 degrees to each other. Other non-coaxially aligned arrangements of the axes X and Y, other than 180 degrees, can be assembled using appropriate components to interconnect pulleys 58P, 61P.

Figure 9:
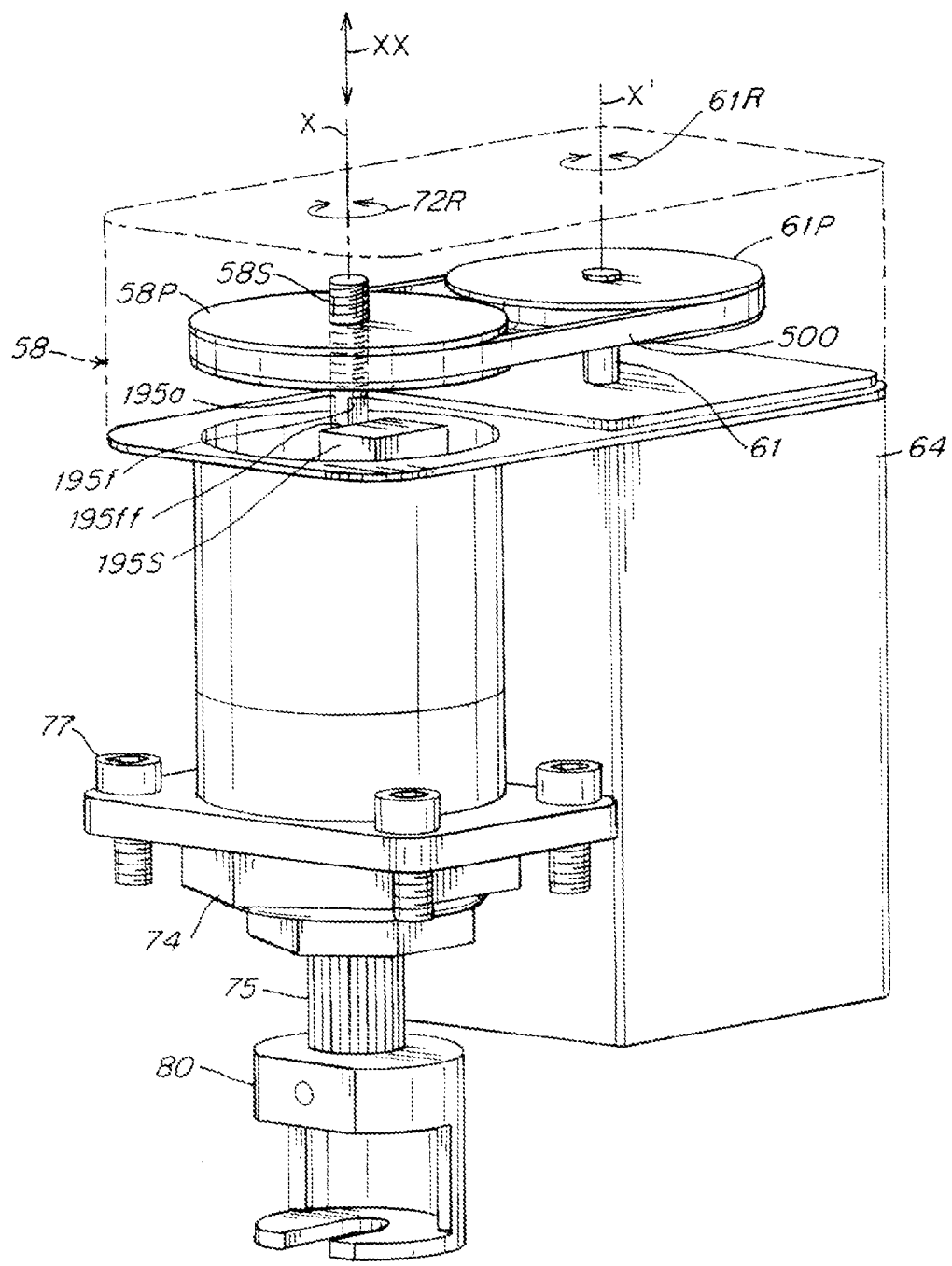
FIG. 9 is a perspective view an electric actuator similar to the FIG. 8 actuator where the transmission shaft has a downstream travelling axial shaft that is interconnected to an upstream rotatable shaft, the upstream travelling shaft being adapted to be non-rotatable.

FIG. 9 shows an embodiment where the transmission pulley 58P has a central internal thread that screwably receives a complementary threaded screw shaft 58S that is driven axially XX by rotation of the pulley 58P. The downstream end of the screw shaft 58S is interconnected to a downstream linear drive stem 195a which is interconnected to or otherwise forms the valve pin 31 of the system. The drive stem 195a is driven linearly XX along X by screw shaft 58S. The drive stem 195a is adapted to be non-rotatable by formation of a flat surface 195f on the outer circumference of the stem 195a and by mounting a stationarily mounted stop member 195S having a complementary flat surface 195ff that is engaged against the flat surface 195f of the stem 195a to prevent rotation thereof. The stem 195a can be a separate part or can be formed as integral with the valve pin itself, in either case the valve pin being non-rotatably by virtue of the flats 195f, 195ff.

An electronic controller 176 can be interconnected to the electric motor. Such a controller is capable of precisely driving the electric coils according to any pre-programmed electronic program, circuit or microcontroller to in turn precisely drive the valve pin to any selected positions along the axis X such that the position of the tip end of the valve pin relative to the gate is precisely controlled over the course of an injection molding cycle.

A position sensor 178 can be used to sense the position of any component of the system that relates to the axial X of the valve pin 31. Such a sensor 178 can sense 177 the rotational or axial position of the transmission gear 190, 72, the transmission linear conversion screw 195, the axis of the rotor 61 of the motor 64 such, the internal screw within the motor that drives the rotor or the magnet that drives the rotor 61, or the position sensor can alternatively sense 179 the axial position of the valve pin 31 itself. The signal 177, 179 that indicates position is input to the controller 176 which can use such a real-time signal in a program to control the rate of drive of the motor rotor 61 and transmission components 190, 72, 195 which in turn control the velocity or rate of travel of upstream withdrawal or downstream closure of the valve pin 31 at selected times or over selected lengths of time over the course of an injection cycle.

With reference to FIGS. 10A-10M, the actuator assembly 66 is generically depicted as a box 66 for purposes of explanation as to how an assembly 66 as described above can be coupled, decoupled and moved laterally and upstream-downstream within a complementary receiving recess provided within plates 39, 45 such that the pin coupling can be coupled to and decoupled from the pin connector without having to dissemble the plates 39, 45 or the actuator 66. Although FIGS. 10A-10M depict the actuator 66 as a single parallelepiped shaped box, the box 66 as shown in FIGS. 10A-10M is analogous to the differently shaped assemblies 66 as described with reference to FIGS. 1-9 at least regarding how the assembly can be coupled, decoupled and moved within the recess 40 formed within plates 39, 45.

As shown in FIGS. 10A-10M the nozzle 18 is mounted in or on one or more metal (e.g. stainless steel) plates. The apparatus includes a heated manifold 24 and one or more other spacer, mounting or mold plates 13, 14. The manifold 24 is heated to maintain the nozzle 18 at an elevated temperature for delivery of the molten plastic. The mold cavity 19 and plates 13, 14 are typically maintained relatively cool by water cooling channels compared to the manifold 24 to enable solidification of the injected molten plastic to form a solid plastic article within the cavity of the mold.

The nozzle 18 is an elongated tubular article 19 typically made of stainless steel and having a central axial bore 21 through which the molten plastic travels to the gate 20 and into the mold cavity. Also in the nozzle bore, aligned along the central bore axis, is an axially elongated valve pin 30 having an axially elongated stem 31, which defines the valve pin axis AA. At one end of the stem, designed to seat and unseat in the nozzle gate for purposes of opening and closing the gate, and effectively starting and stopping flow of the molten plastic to the mold cavity, the stem has an angular or tapered lowermost tip 32. At the opposite or upstream (top) end 33 of the valve stem 31 is a pin head 34 which in the present embodiment comprises a radially enlarged cylindrical member that is receivable within a pin head adapter 94. The valve stem 31 also extends through an elongated plastic feed bore 27 in the heated manifold 24, typically also substantially coaxial with the nozzle bore. The valve stem 31 is guided into and mounted to the manifold 24 by a bushing 28 which receives, guides and mounts the valve stem 31 in the manifold plastic feed bore 27. The pin head 34 and any associated adapter 94 extends axially upstream beyond and from the bushing on the upstream or top side 25 of the manifold.

The pin head 34 may be formed integral with the valve stem 33 (as a single part) or it may be formed as a separate part and then secured to the upstream or top end of the valve stem by conventional means. It may or may not be radially enlarged but is typically formed in a radially enlarged configuration for ease of ready connectivity to and disconnectivity from an adapter component or pin coupling as described below.

Above/upstream of the manifold 24, a pair of upper and lower mounting plates 39, 45 are provided in or on which the actuator 66 is mounted. The plates 39 and 45 are sometimes referred to as top clamping plates, clamping plates or backing plates. The actuator 66 via the transmission drives the valve pin stem axially A, X (linearly) along the coaxial bores of the manifold and nozzle. The housing of the actuator assembly 66 is disposed within a receiving aperture or chamber 40 in the upper mounting plate 39 and/or a chamber 40a in the lower mounting plate 45. As discussed above the assembly 66 can be fixed to the lower mounting plate 45 by threaded bolts 77 which extend into complementary threaded holes 50 in plate 45 so as to removably couple the actuator housing to the mounting plate 39 (see FIG. 10F). In alternative embodiments as discussed above the actuator housing can be attached via bolts 79.

The mounting plates 39, 45 are removably coupled to the mold typically by bolts or similar reversible fastening mechanisms. The chamber 40 of the upper mounting plate 39 (in which the actuator 66 is disposed) is actually a through bore in the upper plate 39 extending from the top surface 42 to the bottom surface 43. The neck 75 extends downwardly into a co-axial bore 40a/40b in the lower mounting plate 45 (40/40a/40b are coaxial).

A pin coupling 80 is attached to or mounted on the neck 75 and is also disposed in the bore 40a/40b of the lower mounting plate 39 when the actuator is connected to the mounting plate. The coupling 80 includes a radial recess 83, disposed laterally (traverse to the elongated valve pin axis. The recess has a radial recess opening 82 that allows a pin head 34 or pin head adapter 94 to be radially inserted into and removed from the radial recess. The coupling 80 also includes a radial slot 84, connected (open) to the radial recess and extending downwardly to the lower surface 90 of the coupling 80. The radial slot has a radial slot opening 85 through which the valve stem 31 can be readily radially inserted or translated within (or removed from) the slot 84 while the adapter 94 is simultaneously radially inserted or translated within (or removed from) the radial recess 82. The coupling 80 has walls 91 that form and act as a housing for the radial recess 83 and radial slot 84. As shown, the pin connector 94 and the recess 83 and recess opening 84 are configured to have a complementary geometry, size, shape and configuration so as to enable the pin connector to be received within the recess 83 and fully surrounded and contained within walls 91 and also to require that the pin connector 94 is receivable within and removable from the recess 83 only by movement of the pin connector 94 in a radial direction R, FIG. 10B, transverse to the axial path of travel A of the neck 75. The pin connector 94 is slidable by manual force along radial direction R into and out of the recess 83 and recess opening 84. As shown when the pin connector 94 is slid into and out of recess 83 and opening 84, the pin stem 31 is simultaneously slidable radially through slot opening 85 into slot 84. The walls 91 act to retain and couple the pin connector 94 and associated pin stem 31 to the neck 75 when the connector 94 is received within recess 83 and stem 31 in slot 84.

In addition, the radial recess 82 is sized and configured to provide a radial clearance 2 in all radial directions between the valve pin adapter 94 and the recess 82 when/while the adapter is received and coupled within the recess 82 of the coupling 80. This radial clearance 2 allows movement in any radial direction of the valve pin adapter while it is mounted in the recess of the actuator coupling, so as to accommodate differences in thermal expansion between various components of the injection molding apparatus such as between the manifold 24 and the mounting plates 39, 45. As previously described, the valve stem 31 is mounted to a manifold 24 when the system is assembled, the manifold being heated during the course of startup to a higher temperature than the relatively cold mounting plates 39, 45 and cold actuator 66. During the time when the manifold 24 is being heated to a higher temperature than the mounting plates and actuator, it is desirable to provide a radial clearance to allow the valve pin assembly (pin 30 and adapter 94), which is mounted to the manifold by the bushing 28 and travels radially therewith and is also being heated via the manifold, to move radially together with the manifold with respect to the mounting plate and the axial path of travel of the actuator so as to prevent the application of undesirable side bending forces on the valve pin assembly. These side forces may bend or break the valve stem or otherwise interfere with proper alignment and operation of the valve pin assembly and actuator.

Figure 10A:
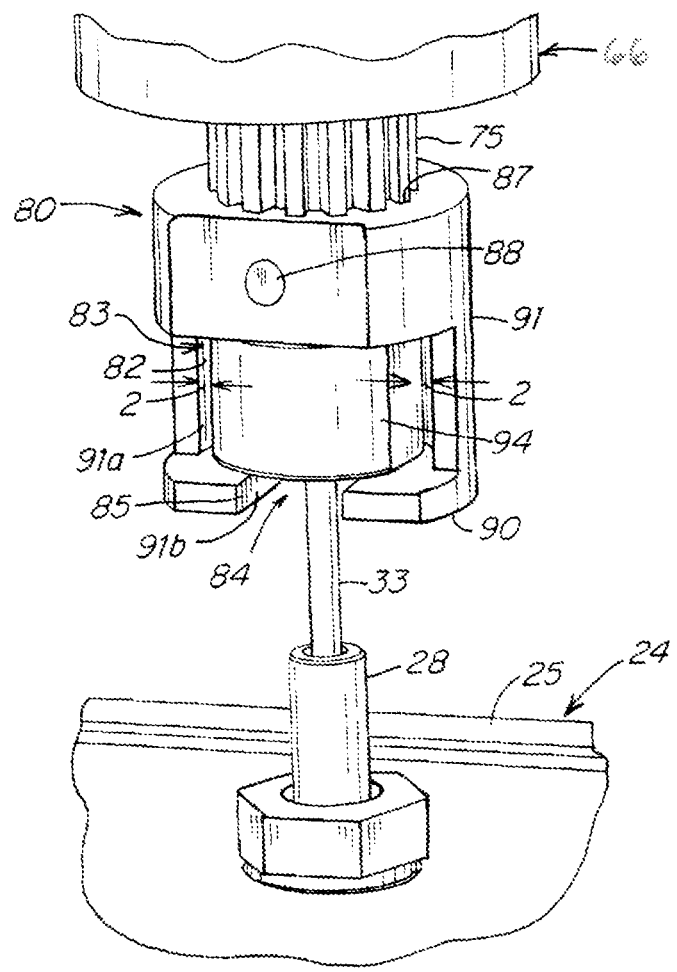
FIG. 10A is an exploded partial schematic view of the pin coupling components of the apparatus shown in FIGS. 1-9, in an assembled state.
Figure 10B:
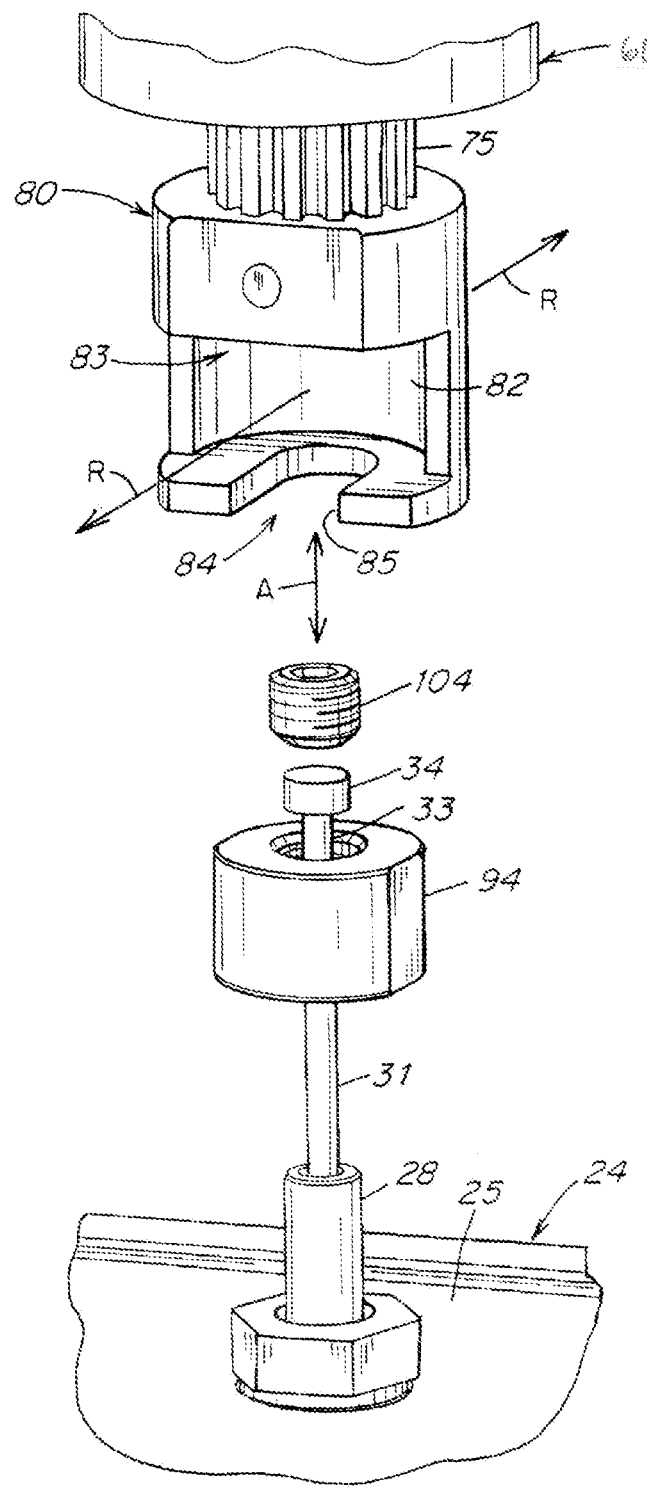
FIG. 10B is an exploded partial schematic view showing the pin coupling components of the apparatus shown in FIGS. 1-9, in a disassembled state.
Figure 10C:
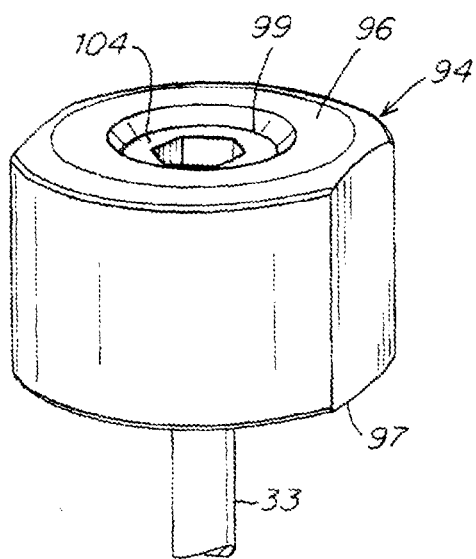
FIG. 10C is an enlarged schematic view of a valve pin head and a pin head adapter, in an assembled state, according to one embodiment.
Figure 10D:
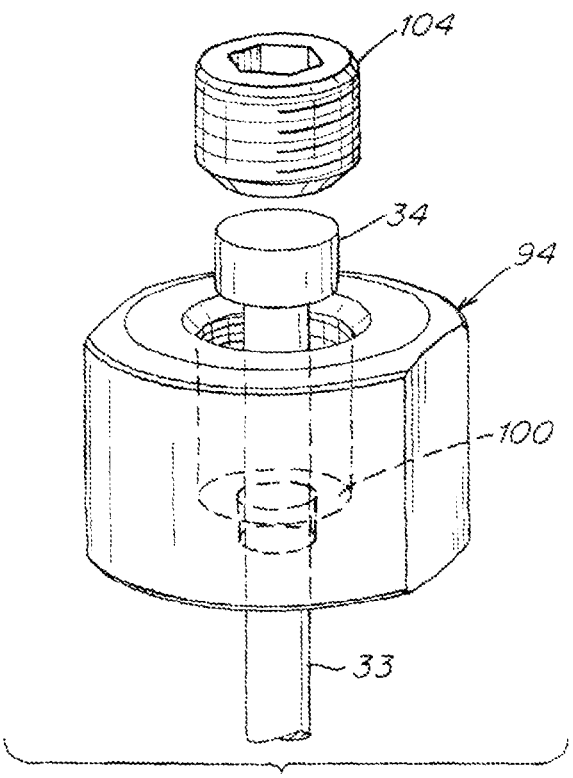
FIG. 10D is an exploded view of the pin head and adapter of FIG. 10C in a disassembled state.

FIGS. 10A, 10B show one embodiment of the coupling apparatus in an assembled state (FIG. 10A) and a disassembled state (10B). In FIG. 10A, the upper end of the valve pin is shown extending upwardly from a manifold bushing 28 secured to the top 25 of the manifold. The pin head 34 and attached adapter 94, at the top end of the valve pin, are disposed completely within the coupling 80 in FIG. 10A. The adapter 94 is radially received in the radial recess 82 of the coupling 80, while the valve stem 31 resides in the radial slot 84 of the coupling. There is a radial clearance 2 provided between the interior surface 91a of the walls 91 defining the radial recess 82 and outside surface of the adapter 94, and between the walls 91b defining the radial slot 84 and valve stem 31, to allow for radial movement of the valve pin assembly (here the valve stem 31, pin head 34 and pin head adapter 94) with respect to the axial drive path A of the actuator 66. The actuator coupling 80 is connected to the spline shaft or neck 75 that is interconnected to the electric actuator motor, by a pin 88 which extends through a bore 87 in the coupling and into a bore in the shaft. This prevents rotation of the coupling relative to the actuator shaft.

FIG. 10B shows the disassembled pin coupling 80 and pin head adapter 94. A cylindrical set screw 104 having outer threads is adapted for threaded engagement with the pin head adapter 94. This is further illustrated in FIG. 10C-10D. The pin head adapter 94 has a central axial through bore 99 extending from the top surface 96 to the bottom surface 97 of the adapter. The bore receives the upper end of the valve stem and pin head 34. The pin head 34 sits on a shoulder 100 in the central bore and is secured in the adapter 94 by screwing the set screw 104 into a threaded upper portion of the bore, creating a pressure engagement of the pin head and adapter. In this embodiment, the adapter essentially functions as an enlarged pin head. In another embodiment, the adapter may not be required, as the pin head itself could be disposed in the radial recess of the actuator coupling.

Figure 10E:
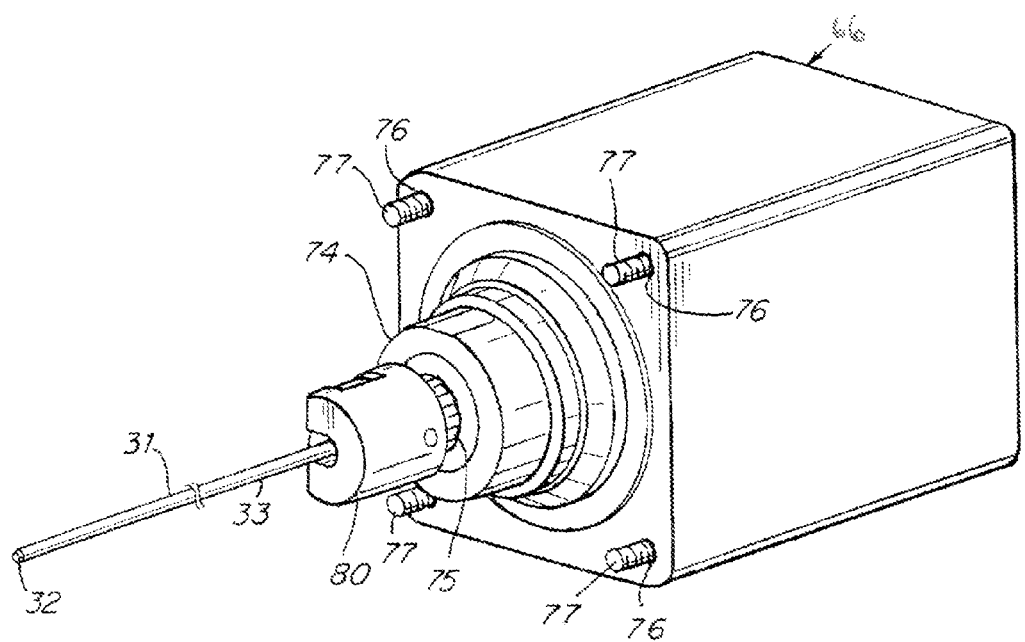
FIG. 10E is a perspective view of one embodiment of an electric actuator coupled to a valve pin.

FIG. 10E shows the actuator housing including four bores 76, one in each corner of the housing, for receiving bolts 77 that removably couple the motor or gear housing 58, 64 to the lower mounting plate 45. Four complementary tapped holes 50 are provided in the upper surface 48 of the lower mounting plate 45 for receiving the bolts 77 and securing the motor housing to the plate. This prevents rotational and other movement of the housing of the motor with respect to the mounting plates and manifold and the injection molding apparatus generally. Extending downwardly from the motor or gear housing 58, 64 is a cylindrical projection 74 from which the neck 75 extends. Coupled to the downstream end of the neck 75 is the actuator coupling 80 and extending axially downstream from the coupling 80 is the valve stem 31.

Figure 10F:
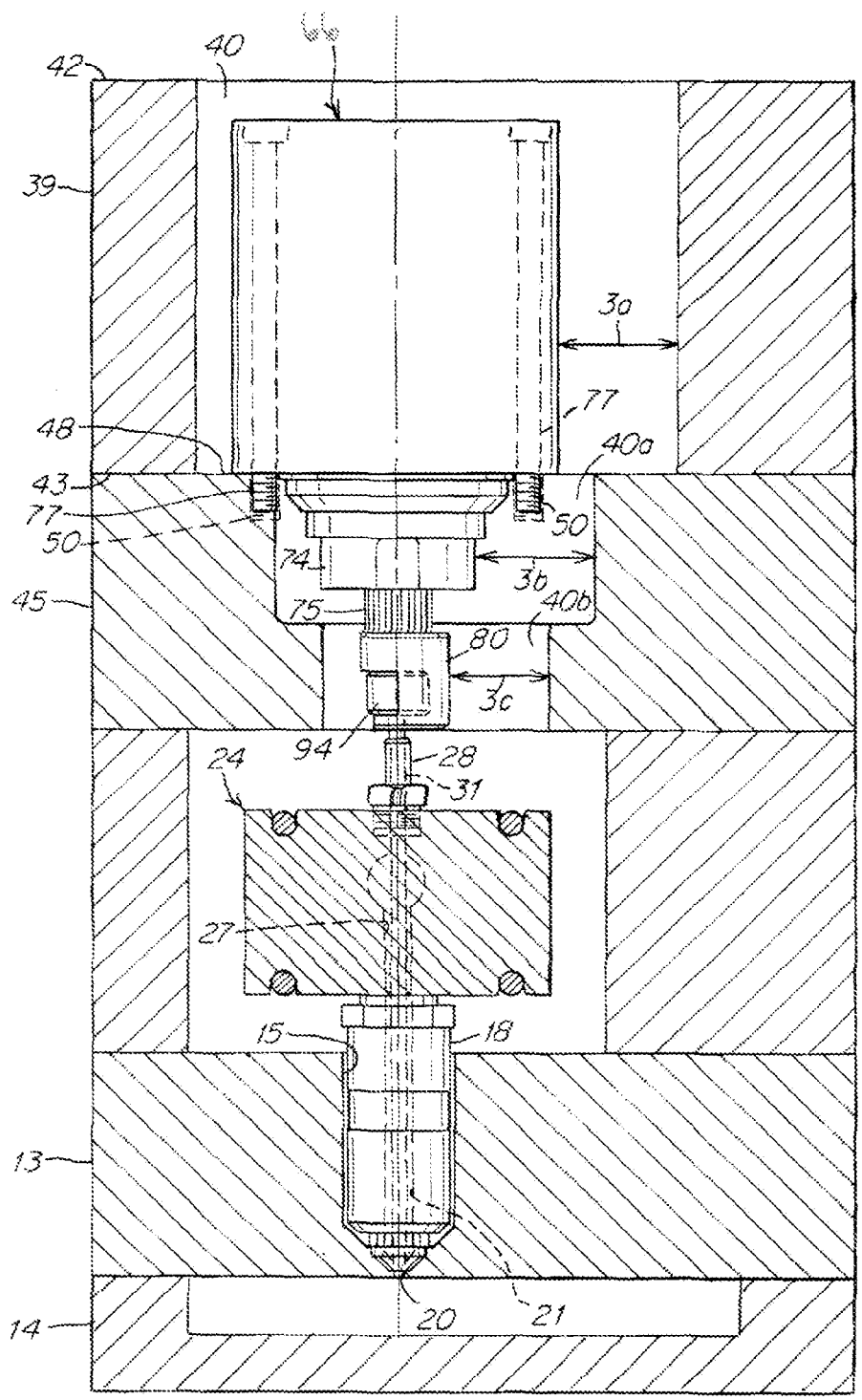
FIG. 10F is a schematic partial cross-sectional view of the actuator and valve pin of FIG. 10E mounted in an injection molding apparatus.
Figure 10G:
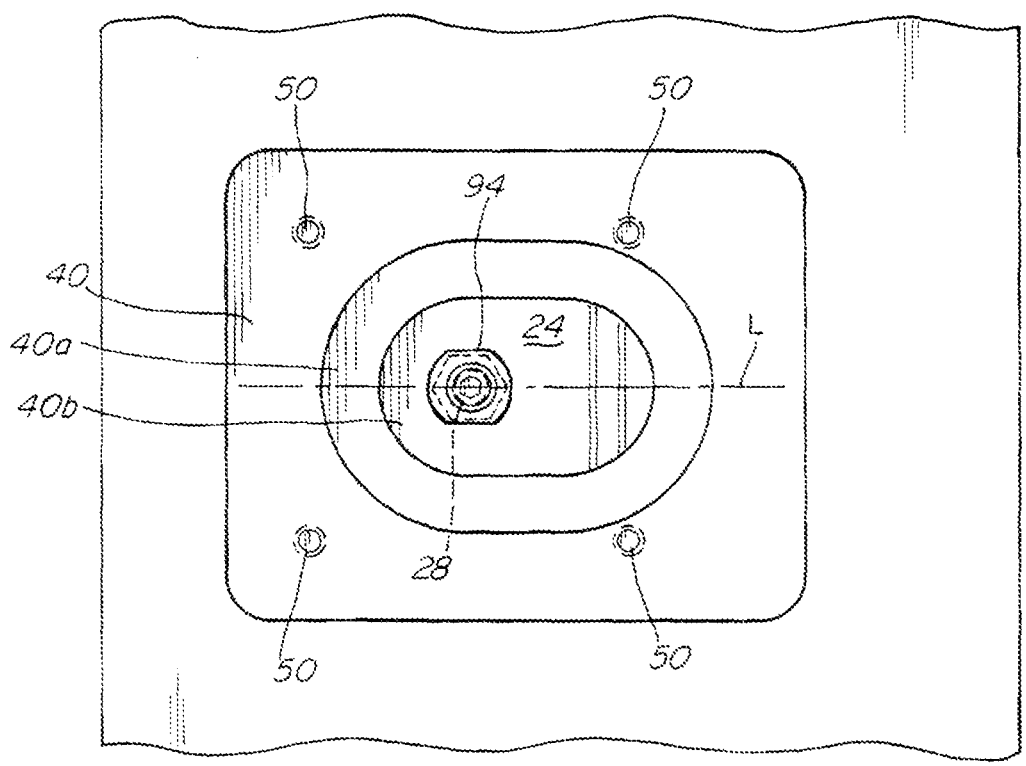
FIG. 10G is a top plan view of the apparatus of FIG. 10E, with the actuator removed.

FIG. 10F is a cross section showing the injection molding stack. As previously described, a heated manifold 24 is disposed between the mounting plates 39/45 and mold plates 13/14. In use, the mounting plates and mold plates are fixedly secured together under high clamp pressure, so as to withstand high injection molding forces. A nozzle 18 extends through a bore 15 in the lower mold plate 14, and seats and unseats in the gate 20 to the injection mold cavity. The actuator 66 housing is disposed in a chamber 40 of the upper mounting plate 39, with a radial clearance 3 provided in at least one radial direction so as to facilitate the radial coupling and decoupling of the pin head adapter and actuator coupling. Similarly, there is a radial clearance 3b/3c to allow the neck 75 and adapter 80 to move radial in the plates. FIG. 10G is a top plan view of the apparatus of FIG. 10F, but with the electric motor removed. The chamber 40 has a rectilinear cross section. Below the chamber 40, the upper bore 40a has an oval cross section, and the lower bore 40b also has an oval but smaller, cross section, providing a radial clearance along the long axis L of the oval, to facilitate the assembly and disassembly steps described below.

Figure 10H:
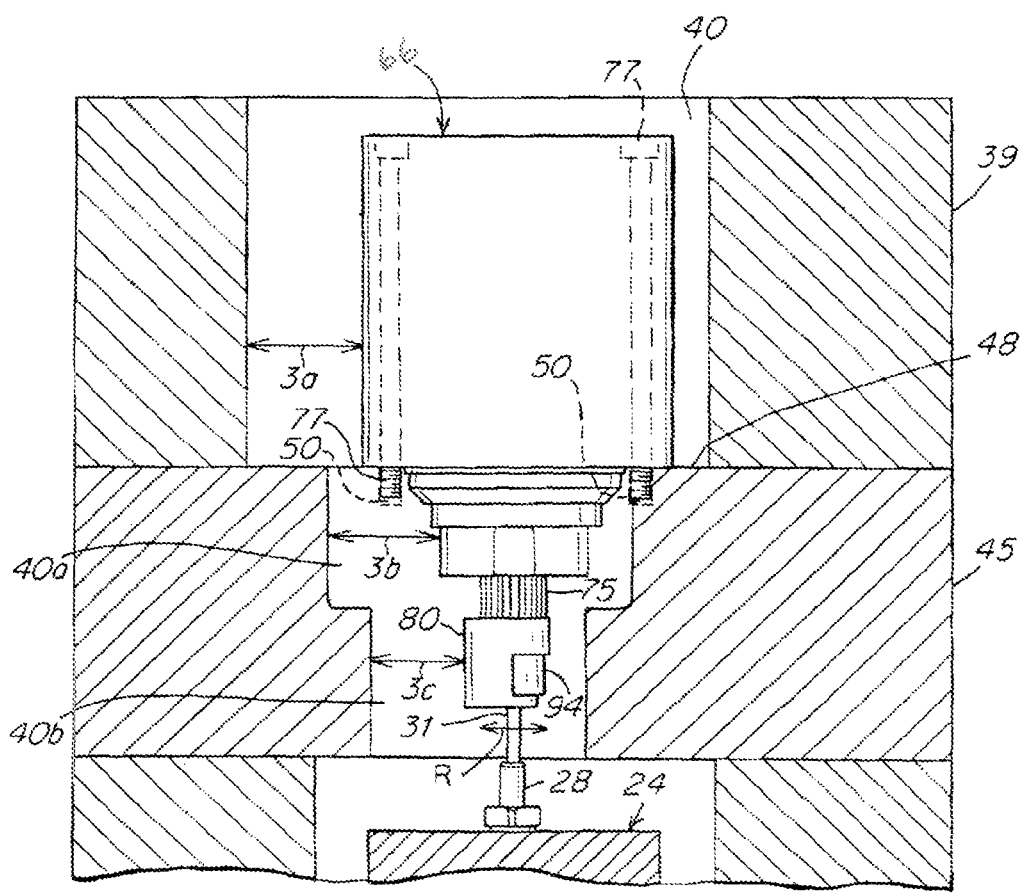

FIGS. 10H-10M illustrate a variety of steps for decoupling the actuator from the mounting plate 39 and for decoupling the valve pin assembly 30, 94 from the actuator coupling 80 and the mounting plate 39, 45, according to one embodiment. In FIG. 10H, the actuator is shown coupled to the valve pin assembly, with the actuator secured to the lower mounting plate and the valve pin assembly mounted in the actuator coupling. This illustrates the actuator and valve pin assembly as assembled during the injection molding cycle, wherein the axial drive path of travel XX of the actuator is substantially axially aligned with the valve stem axis, as the valve stem extends through the axis of the plastic feed bores of the manifold 27 and nozzle 18. The mounting plates 39 45 are clamped to the mold 12 with the manifold 24 secured between the mounting plates and mold.

Figure 10I:
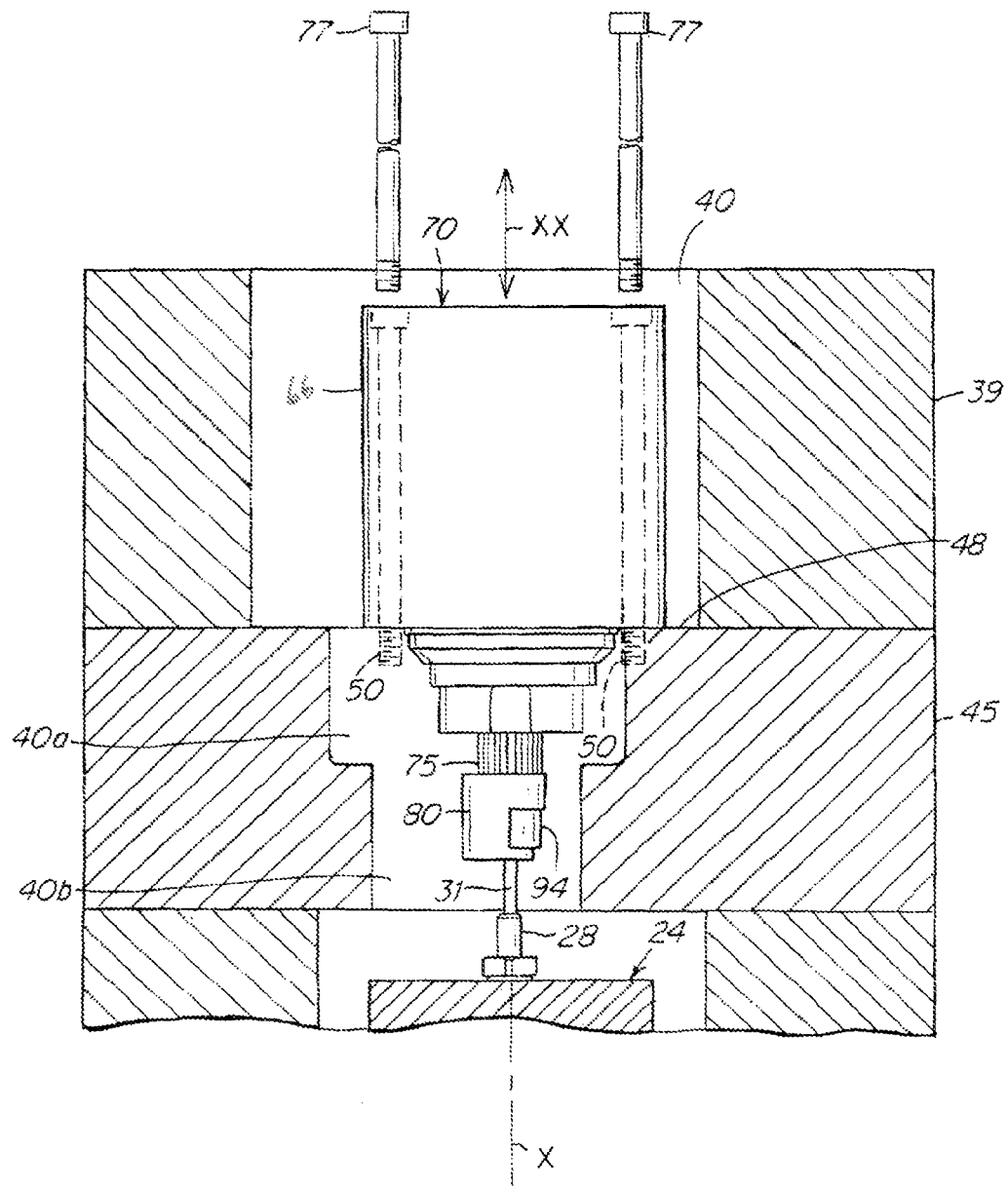
Figure 10J:
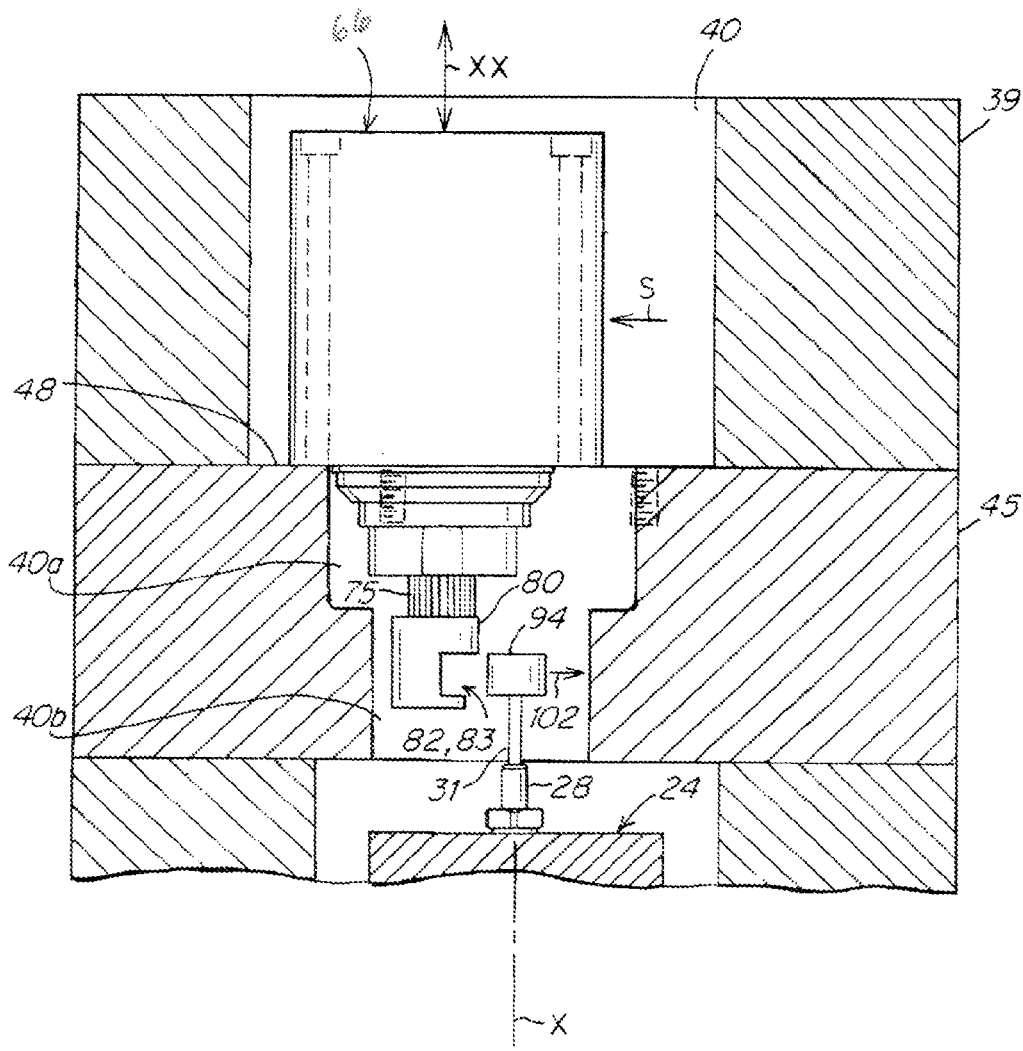
Figure 10K:
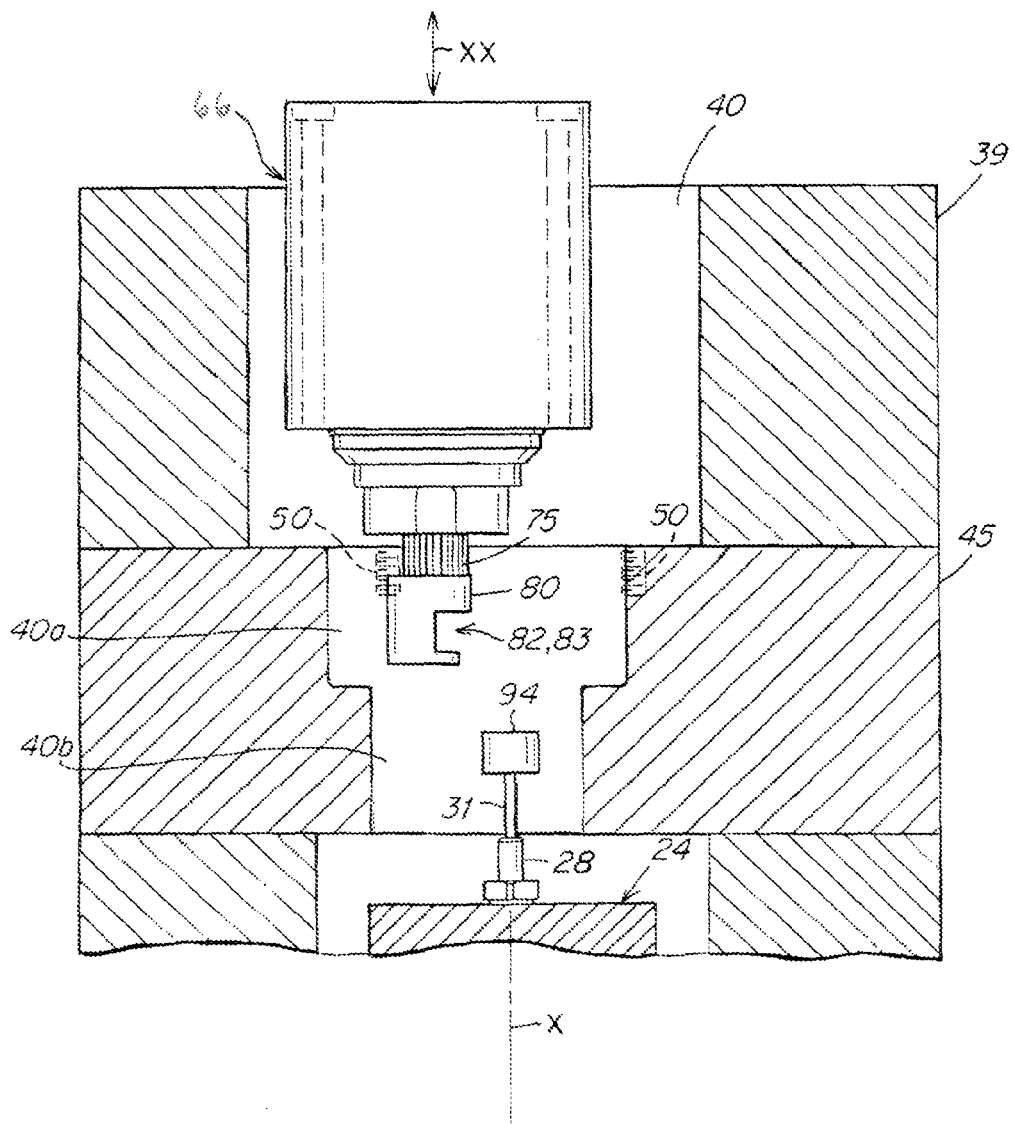
Figure 10L:
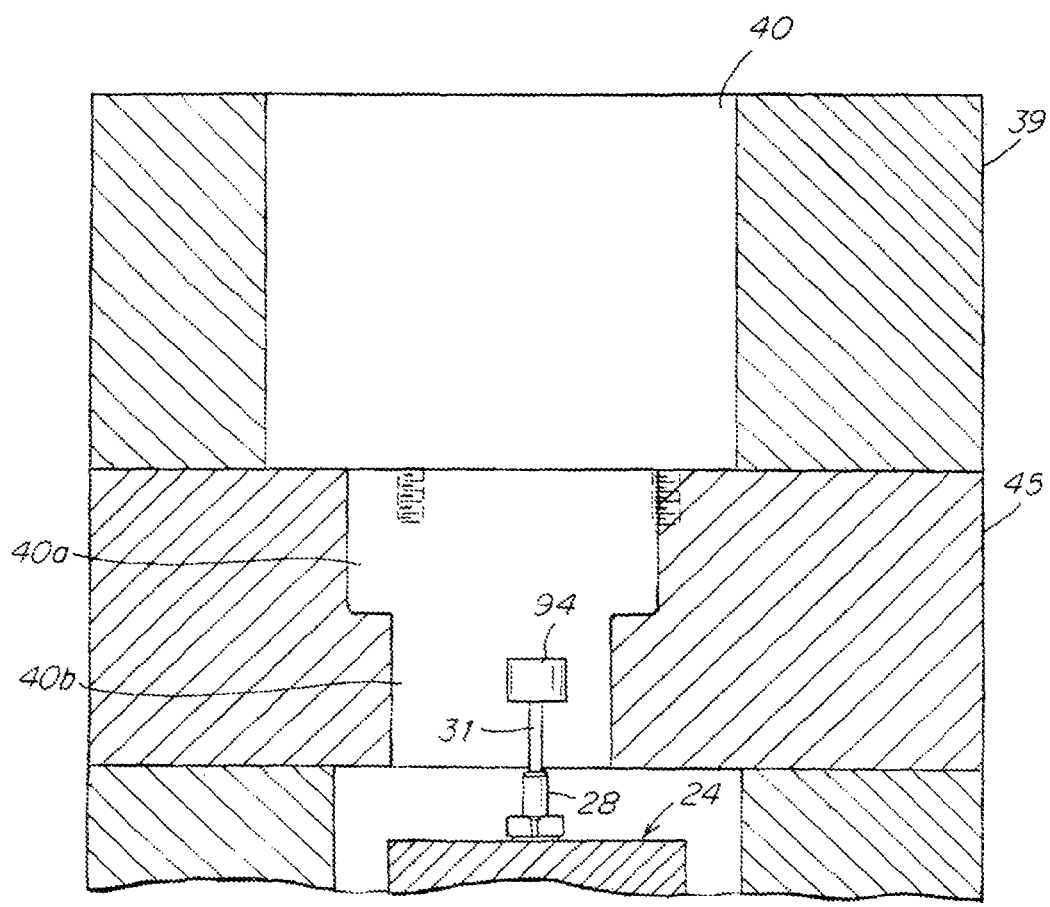

In FIG. 10I the bolts 77 are decoupled from the complementary receiving apertures 50 in the clamp plate 39 thus decoupling the actuator 66 housing from the clamp plate 45. As shown the housing of the actuator 66 and associated neck 75 are disposed upon decoupling of the housing within the plate receiving apertures 40, 40a, 40b. In FIG. 10J, the first two steps of disassembly have been performed. The bolts have been removed and then the actuator 66 housing is moved laterally or radially in direction S so as to decouple pin connector 94 from coupling 80 by sliding the connector 94 radially 102, (FIG. 10J) out of the recess 82, 83 of the coupling. Upon such decoupling of the connector 94, the pin stem 31 and associated parts such as the pin head 34 and adapter 94 and set screw 104 remain behind mounted to the manifold 24 while the actuator 66, is still disposed on the plate 45 and within the recesses 40, 40a, 40b of the mounting plates 39, 45. In a further subsequent operation, the actuator 66 can be removed entirely, FIGS. 10K, 10L, for replacement or repair of the actuator, from the recesses 40, 40a. During this operation the valve pin assembly again remains stationary and behind mounted to the manifold and does not require removal of the pin 30.

Figure 10M:
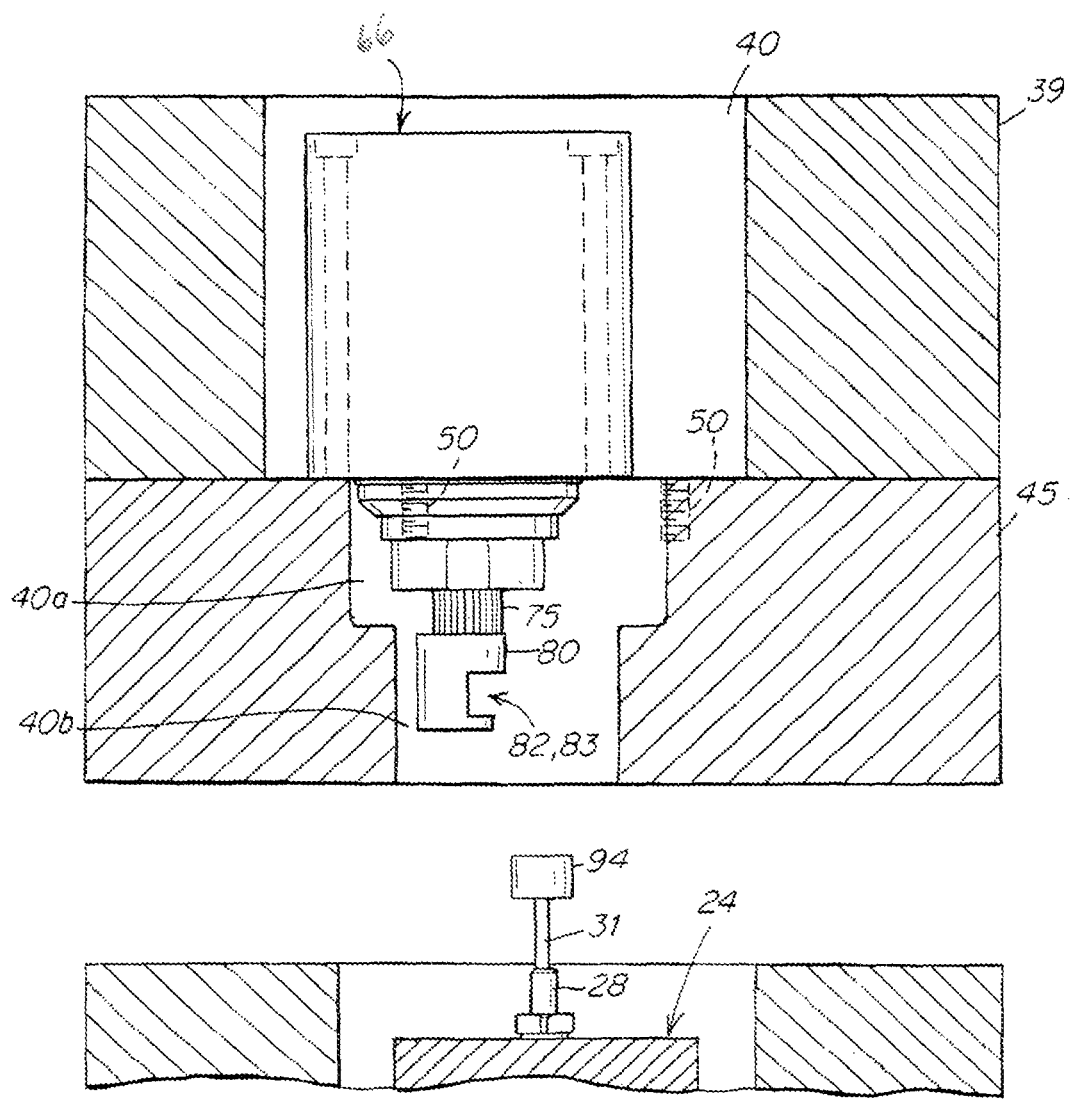

With reference to FIG. 10M, alternatively to removal of only the actuator 66, the mounting plates 39 and/or 45 can also be removed alone or together with the actuator 66 from the mold 12 once the actuator is decoupled from the pin connector 94 without requiring removal of the valve pin 30 (and pin connector 94) from the manifold or nozzle. Thus either the clamp plates 39, 45 can be removed from the system once the pin is decoupled from the actuator coupling 80, or the actuator 66 can removed from the system once the pin is decoupled from the actuator coupling 80, or both the plates and the actuator can be removed from the system once the pin is decoupled from the actuator coupling 80, all such removals being accomplished without removal of the pin 30 from the manifold or nozzle.

What is claimed is:

1. An apparatus for controlling the rate of flow of fluid mold material from an injection molding machine to a mold cavity, the apparatus comprising:

a manifold that receives an injection fluid mold material, the manifold having a delivery channel that delivers the injection fluid mold material under an injection pressure to a gate of a mold cavity disposed within a mold, the gate being controllably opened and closed by a valve pin having a pin axis, the valve pin being slidably mounted for reciprocal upstream and downstream linear movement along the pin axis such that a downstream end of the valve pin is drivable into and out of open and closed positions relative to the gate, an electric actuator comprising an electric motor comprised of a motor housing that houses a drive shaft having a drive gear and a drive axis that is rotatably mounted within the motor housing and is drivably rotatable around the drive axis by a source of electrical power or energy and a transmission comprised of a gear shaft rotatably mounted within a transmission housing, the gear shaft having a gear axis and a transmission gear drivably rotatable around the gear axis, the drive gear and the transmission gear being drivably interconnected and arranged such that the drive axis and the gear axis are non-coaxially mounted or disposed relative to each other and such that driven rotation of the drive gear around the drive axis rotatably drives the gear shaft around the gear axis, a linear travel converter comprising a travel shaft having a travel axis, the gear shaft being interconnected to an upstream end of the linear travel converter and the valve pin being interconnected to a downstream end of the linear travel converter, the interconnection between the converter and the gear shaft being adapted to convert rotation of the gear shaft to linear travel of the travel shaft along the travel axis, the linear travel converter being mounted for controllable upstream and downstream linear travel together with the valve pin via the interconnection of the downstream end of the linear travel converter to the valve pin, wherein one or the other of the motor housing or the transmission housing are removably attached to a top clamping or mounting plate that is mounted upstream of the manifold and fixedly interconnected to the mold.

2. The apparatus of claim 1 wherein the valve pin comprises a pin stem and a pin connector, the linear travel converter having a pin coupling that is reversibly couplable to and decouplable from the pin connector in a radial direction relative to the travel axis, the pin stem extending from the linear travel converter into the manifold when the actuator is coupled to the top clamping or mounting plate and the pin connector is received within the actuator coupling, the actuator being mounted on, to or within the top clamping or mounting plate for radial movement upon decoupling of the actuator from the top clamping or mounting plate such that the pin connector is decouplable from the pin coupling upon said radial movement while the actuator is disposed on or within the mounting plate, the actuator being removable from on or within the mounting plate leaving the valve stem behind extending into the manifold.

3. The apparatus of claim 2 wherein the pin connector comprises an adapter coupled to a top or upstream end of the stem, the adapter configured to be reversibly receivable within the coupling in a radial direction.

4. The apparatus of claim 3 wherein the adapter comprises an enlarged head which is reversibly couplable to and decouplable from the coupling.

5. The apparatus of claim 2 wherein the system is adapted to allow the pin connector to travel a selected radial distance within the coupling and to remain coupled while the top clamping or mounting plate remains coupled to the mold and the pin stem remains extended into the manifold.

6. The apparatus of claim 2 wherein the pin stem is mounted to the manifold for radial movement of the pin stem together with the manifold relative to the top clamping or mounting plate.

7. The apparatus of claim 3 wherein the apparatus is adapted to allow the adapter to travel a selected radial distance within the coupling relative to the axial path of travel while the mounting plate remains coupled to the mold, the pin connector remains coupled to the actuator coupling and the pin stem remains extended into the manifold.

8. The apparatus of claim 3 wherein the top clamping or mounting plate is decouplable from the mold leaving the pin stem extended into the manifold when the adapter is decoupled from the coupling.

9. The apparatus of claim 1 wherein the motor housing is removably attached to the top clamping or mounting plate and the transmission housing is removably attached to the motor housing.

10. The apparatus of claim 1 wherein the transmission housing is removably attached to the top clamping or mounting plate and the motor housing is removably attached to the motor housing.

11. The apparatus of claim 1 wherein the actuator is interconnected to a controller that includes instructions that instruct the actuator to drive the valve pin upstream continuously beginning from the closed position to one or more intermediate upstream positions at one or more intermediate rates of travel that are less than a maximum velocity at which the actuator is capable of driving the valve pin for either a predetermined amount of time or for a predetermined length of upstream travel.

12. The apparatus of claim 11 wherein the actuator includes instructions that instruct the actuator to drive the valve pin continuously upstream from the one or more intermediate upstream positions to a maximum upstream position at one or more high rates of travel that are equal to or greater than the one or more intermediate rates of travel.

13. The apparatus of claim 11 further comprising a position sensor that senses a position of either the actuator or the valve pin, the position sensor sensing the position of the actuator or the valve pin and sending a signal indicative of the position of the actuator or the valve pin to the controller;

the controller instructing the actuator to drive the valve pin continuously upstream from the one or more intermediate upstream positions at the one or more high rates of travel on detection by the position sensor of the valve pin at the one or more intermediate upstream positions.

14. The apparatus of claim 1 wherein the drive gear and the transmission gear are rotatably interconnected via gears or via belt and pulley.

15. The apparatus of claim 1 wherein the controller includes instructions that instruct the actuator to drive the valve pin at one or more high rates of downstream travel that are equal to or less than a maximum rate of downstream travel at which the actuator is capable of driving the valve pin when the valve pin is disposed at a maximum upstream position during the course of an injection cycle, the controller including instructions that instruct the actuator to drive the valve pin at one or more intermediate rates of downstream travel that are less than the one or more high rates of downstream travel on expiration of a predetermined amount of time or for a predetermined amount of downstream travel of the valve pin from the maximum upstream position.

16. The apparatus of claim 15 further comprising a position sensor that senses a position of either the actuator or the valve pin, the position sensor sensing the position of the actuator or the valve pin and sending a signal indicative of the position of the actuator or the valve pin to the controller;

the controller instructing the actuator to drive the valve pin continuously downstream at the one or more intermediate rates of downstream travel on detection by the position sensor of the valve pin having travelled the predetermined amount of downstream travel from the maximum upstream position.

17. A method of driving a valve pin in apparatus for controlling the rate of flow of fluid mold material from an injection molding machine to a mold cavity, the apparatus comprising:

a manifold that receives an injection fluid mold material, the manifold having a delivery channel that delivers the injection fluid mold material under an injection pressure to a gate of a mold cavity disposed within a mold, the gate being controllably opened and closed by a valve pin having a pin axis, a pin stem and a pin connector, the valve pin being slidably mounted for reciprocal upstream and downstream linear movement along the pin axis such that a downstream end of the valve pin is drivable into and out of open and closed positions relative to the gate, an electric actuator comprising an electric motor comprised of a motor housing that houses a drive shaft having a drive gear and a drive axis that is rotatably mounted within the motor housing and is drivably rotatable around the drive axis by a source of electrical power or energy and a transmission comprised of a gear shaft rotatably mounted within a transmission housing, the gear shaft having a gear axis and a transmission gear drivably rotatable around the gear axis, the drive gear and the transmission gear being drivably interconnected and arranged such that the drive axis and the gear axis are non-coaxially mounted or disposed relative to each other and such that driven rotation of the drive gear around the drive axis rotatably drives the gear shaft around the gear axis, a linear travel converter comprising a travel shaft having a travel axis, the gear shaft being interconnected to an upstream end of the linear travel converter and the valve pin being interconnected to a downstream end of the linear travel converter, the linear travel converter having a pin coupling that is reversibly couplable to and decouplable from the pin connector in a radial direction relative to the travel axis, the interconnection between the converter and the gear shaft being adapted to convert rotation of the gear shaft to linear travel of the travel shaft along the travel axis, the linear travel converter being mounted for controllable upstream and downstream linear travel together with the valve pin via the interconnection of the downstream end of the linear travel converter to the valve pin, wherein one or the other of the motor housing or the transmission housing are removably attached to a top clamping or mounting plate that is mounted upstream of the manifold and fixedly interconnected to the mold, the method comprising:

decoupling the actuator from the top clamping or mounting plate, radially moving the actuator while the actuator is disposed on or within the top clamping or mounting plate a distance sufficient to decouple the pin connector from the pin coupling.

18. The method of claim 17 further comprising removing the actuator from on or within the top clamping or mounting plate leaving the valve stem behind extending into the manifold.

19. A method of driving a valve pin in apparatus for controlling the rate of flow of fluid mold material from an injection molding machine to a mold cavity, the apparatus comprising a manifold that receives an injection fluid mold material, the manifold having a delivery channel that delivers the injection fluid mold material under an injection pressure to a gate of a mold cavity disposed within a mold, the gate being controllably opened and closed by a valve pin having a pin axis, the valve pin being slidably mounted for reciprocal upstream and downstream linear movement along the pin axis such that a downstream end of the valve pin is drivable into and out of open and closed positions relative to the gate, an electric actuator comprising an electric motor comprised of a motor housing that houses a drive shaft having a drive gear and a drive axis that is rotatably mounted within the motor housing and is drivably rotatable around the drive axis by a source of electrical power or energy and a transmission comprised of a gear shaft rotatably mounted within a transmission housing, the gear shaft having a gear axis and a transmission gear drivably rotatable around the gear axis, the method comprising:

meshing and arranging the drive gear and the transmission gear such that the drive axis and the gear axis are disposed at a non-coaxial angle relative to each other and such that driven rotation of the drive gear rotatably drives the gear shaft around the gear axis, interconnecting a linear travel converter comprising a travel shaft having a travel axis to an upstream end of the liner travel converter and interconnecting the valve pin to a downstream end of the linear travel converter, adapting the interconnection between the converter and the gear shaft to convert rotation of the gear shaft to linear travel of the travel shaft along the travel axis, mounting the linear travel converter for controllable upstream and downstream linear travel together with the valve pin via the interconnection of the downstream end of the linear travel converter to the valve pin, removably attaching one or the other of the motor housing or the transmission housing to a top clamping or mounting plate that is mounted upstream of the manifold and fixedly interconnected to the mold.

* * * * *